(12) United States Patent
Schultz et al.

(10) Patent No.: US 10,972,437 B2
(45) Date of Patent: Apr. 6, 2021

(54) APPLICATIONS AND INTEGRATED FIREWALL DESIGN IN AN ADAPTIVE PRIVATE NETWORK (APN)

(71) Applicant: Talari Networks Incorporated, San Jose, CA (US)

(72) Inventors: Adam Phillip Schultz, Morrisville, NC (US); Brad Peabody, Wake Forest, NC (US); Noah Ash, Raleigh, NC (US); Yu Yu Aung, Alhambra, CA (US); Todd Martin, Campbell, CA (US)

(73) Assignee: TALARI NETWORKS INCORPORATED, San Jose, CA (US)

( * ) Notice: Subject to any disclaimer, the term of this patent is extended or adjusted under 35 U.S.C. 154(b) by 234 days.

(21) Appl. No.: 15/667,786

(22) Filed: Aug. 3, 2017

(65) Prior Publication Data
US 2018/0041470 A1 Feb. 8, 2018

Related U.S. Application Data

(60) Provisional application No. 62/371,998, filed on Aug. 8, 2016.

(51) Int. Cl.
*H04L 29/06* (2006.01)
*H04L 12/851* (2013.01)
(Continued)

(52) U.S. Cl.
CPC ............ *H04L 63/029* (2013.01); *H04L 47/24* (2013.01); *H04L 63/0263* (2013.01); *H04L 43/10* (2013.01); *H04L 45/22* (2013.01); *H04L 45/24* (2013.01); *H04L 45/54* (2013.01); *H04L 63/0272* (2013.01)

(58) Field of Classification Search
CPC .............. H04L 63/029; H04L 63/0272; H04L 63/0263; H04L 47/24; H04L 45/22
See application file for complete search history.

(56) References Cited

U.S. PATENT DOCUMENTS

| 5,790,546 A | * | 8/1998 | Dobbins | ............. H04L 12/5602 370/392 |
| 8,125,907 B2 | | 2/2012 | Averi et al. | |

(Continued)

*Primary Examiner* — Harunur Rashid
(74) *Attorney, Agent, or Firm* — Jenkins, Wilson, Taylor & Hunt, P.A

(57) ABSTRACT

A firewall is described that is integrated in an input stage of a packet processing pipeline so that it recognizes and has access to internal information regarding the different services, such as conduit, intranet, Internet, local vs WAN, applications, and security zones, of a communication network, such as an adaptive private network (APN). The integrated firewall is able to dynamically access the service type, respond to the service type, and adjust the service type based on conditions in the network. Since application awareness and security functions are integrated, customers can set security policies on software applications. The integrated firewall also provides automatic detection of applications, classifies applications based on domain names, steers traffic to services according to software applications, reports on software applications in passthrough traffic, and provides analysis of traffic that does not match a software application so that a user can investigate and define custom applications.

19 Claims, 18 Drawing Sheets

(51) Int. Cl.
*H04L 12/707* (2013.01)
*H04L 12/26* (2006.01)
*H04L 12/741* (2013.01)

(56) References Cited

U.S. PATENT DOCUMENTS

| | | | |
|---|---|---|---|
| 8,200,827 B1* | 6/2012 | Hunyady | H04L 63/029 709/217 |
| 8,274,891 B2 | 9/2012 | Averi et al. | |
| 8,452,846 B2 | 5/2013 | Fredette et al. | |
| 8,644,164 B2 | 2/2014 | Averi et al. | |
| 8,775,547 B2 | 7/2014 | Fredette et al. | |
| 9,069,727 B2 | 6/2015 | Martin et al. | |
| 9,100,338 B2 | 8/2015 | Averi et al. | |
| 9,392,061 B2 | 7/2016 | Fredette et al. | |
| 2003/0065944 A1* | 4/2003 | Mao | H04L 63/02 726/25 |
| 2009/0310485 A1* | 12/2009 | Averi | H04L 45/00 370/232 |
| 2010/0043067 A1* | 2/2010 | Varadhan | H04L 12/18 726/13 |
| 2010/0043068 A1* | 2/2010 | Varadhan | H04L 12/4633 726/15 |
| 2013/0339516 A1* | 12/2013 | Chauhan | H04W 4/18 709/224 |
| 2015/0071067 A1 | 3/2015 | Martin et al. | |
| 2016/0072706 A1 | 3/2016 | Huang et al. | |
| 2016/0179850 A1 | 6/2016 | Martin et al. | |
| 2016/0182305 A1 | 6/2016 | Martin et al. | |
| 2016/0182319 A1 | 6/2016 | Martin et al. | |
| 2016/0182327 A1 | 6/2016 | Coleman, Jr. et al. | |
| 2016/0197802 A1 | 7/2016 | Schultz et al. | |
| 2017/0207963 A1 | 7/2017 | Mehta et al. | |
| 2017/0207976 A1 | 7/2017 | Rovner et al. | |
| 2017/0207996 A1 | 7/2017 | Lui et al. | |
| 2017/0207997 A1 | 7/2017 | Martin et al. | |

\* cited by examiner

```
Protocol Info
...
```

▼ Queries
  ▼ mail.google.com: type A, class IN  ⎬ 504
    Name: mail.google.com
    [Name Length: 15]
    [Label Count: 3]
    Type: A (Host Address) (1)
    Class: IN (0x0001)

▼ Answers                                                                      ⎬ 510
  ▼ mail.google.com: type CNAME, class IN, cname googlemail.l.google.com
    Name: mail.google.com
    Type: CNAME (Canonical NAME for an alias) (5)
    516 — Class: IN (0x0001)
         Time to live: 13990
    512 — Data length: 15
         CNAME: googlemail.l.google.com — 514
  ▼ googlemail.l.google.com: type A, class IN, addr 216.58.219.229
    Name: googlemail.l.google.com
    Type: A (Host Address) (1)
    518 — Class: IN (0x0001)
         Time to live: 299
         Data length: 4

```
Protocol Info
▼ Queries
  ▶ fedoraproject.org: type A, class IN          ⎫
    Name: fedoraproject.org                      ⎪
    [Name Length: 17]                            ⎬ 604
    [Label Count: 2]                             ⎪
    Type: A (Host Address) (1)                   ⎪
    Class: IN (0x0001)                           ⎭
▼ Answers
  ▶ fedoraproject.org: type A, class IN, addr 209.132.181.16    ⎫
    Name: fedoraproject.org                                     ⎪
    Type: A (Host Address) (1)                                  ⎪
    Class: IN (0x0001)                                          ⎪
    Time to live: 38                                            ⎪
    Data length: 4                                              ⎪
    Address: 209.132.181.16 (209.132.181.16)                    ⎬ 610
  ▶ fedoraproject.org: type A, class IN, addr 67.203.2.67       ⎪
    Name: fedoraproject.org                                     ⎪
    Type: A (Host Address) (1)                                  ⎪
    Class: IN (0x0001)                                          ⎪
    Time to live: 38                                            ⎪
    Data length: 4                                              ⎪
    Address: 67.203.2.67 (67.203.2.67)                          ⎭
```

APPLICATIONS AND INTEGRATED FIREWALL DESIGN IN AN ADAPTIVE PRIVATE NETWORK (APN)

The present application claims the benefit of U.S. Provisional Application No. 62/371,998 titled "Applications and Integrated Firewall Design in an Adaptive Private Network (APN)" which was filed on Aug. 8, 2016 and which is incorporated herein by reference in its entirety.

CROSS REFERENCE TO RELATED APPLICATIONS

The present application is also related to U.S. patent application Ser. No. 14/146,786 filed on Jan. 3, 2014 which issued as U.S. Pat. No. 9,100,338 entitled "Flow-Based Adaptive Private Network With Multiple Wan-Paths", which is a divisional of U.S. patent application Ser. No. 13/592,460 filed on Aug. 23, 2012 which issued as U.S. Pat. No. 8,644,164 entitled "Flow-Based Adaptive Private Network With Multiple WAN-Paths", which is a continuation of U.S. patent application Ser. No. 13/353,693 filed on Jan. 19, 2012 which issued as U.S. Pat. No. 8,274,891 entitled "Flow-Based Adaptive Private Network With Multiple WAN-Paths", which is a continuation of U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which issued as U.S. Pat. No. 9,392,061 entitled "Adaptive Private Network Asynchronous Distributed Shared Memory Services", which is a continuation of U.S. patent application Ser. No. 13/850,411 filed on Mar. 26, 2013 which issued as U.S. Pat. No. 8,775,547 entitled "Adaptive Private Network Asynchronous Distributed Shared Memory Services", and which is a continuation of U.S. patent application Ser. No. 13/208,825 filed on Aug. 12, 2011 which issued as U.S. Pat. No. 8,452,846 entitled "Adaptive Private Network Asynchronous Distributed Shared Memory Services", all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 which issued as U.S. Pat. No. 9,069,727 entitled "An Adaptive Private Network with Geographically Redundant Network Control Nodes"; U.S. patent application Ser. No. 14/019,723 filed on Sep. 6, 2013 and published as U.S. Patent Application No. 2015-0071067 A1 entitled "An Adaptive Private Network with Path Maximum Transmission Unit (MTU) Discovery Process"; U.S. patent application Ser. No. 14/481,335 filed on Sep. 9, 2014 and published as U.S. Patent Application No. 2016-0072706 A1 entitled "Adaptive Private Network with Dynamic Conduit Process"; U.S. patent application Ser. No. 14/972,270 filed on Dec. 17, 2015 and published as U.S. Patent Application No. 2016-0182305 A1 entitled "Methods and Apparatus for Providing Adaptive Private Network Centralized Management System Discovery Processes"; U.S. patent application Ser. No. 14/972,353 filed on Dec. 17, 2015 and published as U.S. Patent Application No. 2016-0182319 A1 entitled "Methods and Apparatus for Providing Adaptive Private Network Centralized Management System Timestamp Correlation Processes"; U.S. patent application Ser. No. 14/972,514 filed on Dec. 17, 2015 and published as U.S. Patent Application No. 2016-0179850 A1 entitled "Methods and Apparatus for Providing Adaptive Private Network Database Schema Migration and Management Processes"; U.S. patent application Ser. No. 14/973,193 filed on Dec. 17, 2015 and published as U.S. Patent Application No. 2016-0182327 A1 entitled "Methods and Apparatus for Providing Adaptive Private Network Centralized Management System Data Visualization Processes"; U.S. patent application Ser. No. 14/973,343 filed on Dec. 17, 2015 and published as U.S. Patent Application No. 2016-0197802 A1 entitled "Methods and Apparatus for Providing Adaptive Private Network Centralized Management System Time Correlated Playback of Network Traffic"; U.S. patent application Ser. No. 15/409,001 filed on Jan. 18, 2017 and published as U.S. Patent Application Serial No. 2017-0207996 A1 entitled "Methods and Apparatus for Configuring a Standby WAN Link in an Adaptive Private Network"; U.S. patent application Ser. No. 15/409,006 filed on Jan. 18, 2017 and published as U.S. Patent Application Serial No. 2017-0207997 A1 entitled "Methods And Apparatus For Accessing Selectable Application Processing Of Data Packets In An Adaptive Private Network"; U.S. patent application Ser. No. 15/409,016 filed on Jan. 18, 2017 and published as U.S. Patent Application Serial No. 2017-0207963 A1 entitled "Methods and Apparatus for Accessing Dynamic Routing Information from Networks Coupled to a Wide Area Network (WAN) to Determine Optimized End-To-End Routing Paths"; and U.S. patent application Ser. No. 15/409,019 filed on Jan. 18, 2017 and published as U.S. Patent Application Serial No. 2017-0207976 A1 entitled "Adaptive Private Network (APN) Bandwidth Enhancements", all of which have the same assignee as the present application, are related applications, and are hereby incorporated by reference in their entirety.

FIELD OF THE INVENTION

The present invention relates generally to improved software applications and edge router capabilities to provide security features in a network. More specifically, the present invention relates to improved edge router capabilities for determining optimized secure routing paths over an end-to-end system connecting different LANs via a WAN system in the context of an adaptive private network (APN).

BACKGROUND OF THE INVENTION

A firewall is a network system that monitors and filters network traffic according to a pre-specified set of security policies. A security policy may be implemented by a set of security rules in the software. The security rules are lower level entities that the software uses when processing traffic. The management software is expected to map security policies specified by a user into a set of security rules that the software uses. In products where the policy mapping is not very sophisticated, policies and rules might be difficult to distinguish, whereas a more sophisticated mapping makes the difference clearer.

The firewall is generally placed in a network between a customer's node that is to be protected and secured and an external network, such as the Internet, which is assumed to not be protected and secured.

Many firewalls are implemented as packet filters which examine information contained in a message packet, such as network source and destination addresses and ports, to make a determination whether to allow the message packet to pass into the system or to be blocked or discarded, for example.

The packet examination process uses a pre-specified set of packet filtering rules, including allowed addresses and ports, and, in many instances, makes use of the first three layers of the open system interconnection (OSI) reference model. The first three layers of OSI include a physical layer, a data link layer, and a network layer. Firewalls also reside in similar corresponding layers on other network models. These early firewalls are considered to be a first generation design.

Second generation designs go up a layer in the network model, using a further layer, such as the layer 4 transport layer in the OSI model. The second generation designs consider the connection state of the packet, such as identifying a received packet as a beginning packet of a new message, or that it is part of an ongoing communication having a plurality of packets, or something different, such as belonging to some other communication connection. The second generation firewalls expand the security rules to include connection state rules.

Third generation designs take into account all layers of the network stack up to and including OSI application layer 7. The third generation designs determine what software application is utilizing the message packet to determine, for example, if the software application is authorized and if the packet is being used appropriately. Next generation firewalls take this packet examination to greater depths.

In networking, a firewall provides a way to segment networks and control the types of traffic that can pass between the networks. Routing allows networks to be segmented and isolated, but when a route is setup so that network A can talk to network B, all traffic is generally allowed between A and B. This lack of control on individual communications between network A and network B means that viruses, malware and the like still have a means to spread from one network to another network. Security policies are often instituted for the networks that have reachability to each other to limit or in some cases, curtail communication between the two networks. Security policies can also dictate that only certain types of traffic are allowed to communicate across networks. Such limitations restrict communication and increase communication costs. Also, firewalls are typically add-on devices or a separately installed layer of software from an external vendor and which is generally not close to the physical network layers. Such add-on firewalls are costly and are at a disadvantage in not having full access to internal knowledge of various networks and connections being used in an operational system. Further, as networks, including adaptive private networks (APNs), become larger and more complex, providing security for such networks is increasingly more complex and costly.

SUMMARY OF THE INVENTION

Among its several aspects, the present invention recognizes that improved firewalls and techniques for providing improved communication security at lower costs in a network is advantageous. To such ends, an embodiment of the invention applies a method for integrated firewall packet filtering based on global security zones of a communication network. A packet is received in an input stage of a packet processing pipeline. A network destination security zone is set in a header of the received packet by a firewall integrated in the input stage of the packet processing pipeline. The received packet is stopped at the input stage from transmitting to a site in the network destination security zone if the network destination security zone is not an allowed security zone destination for the received packet in the communication network Also, an embodiment of the invention applies a method for integrated firewall packet filtering based on global security zones of a communication network. A source security zone is assigned in addition to a source address and a source port in a header of a packet received in an input stage of a packet processing pipeline by an integrated firewall for transmission of the packet across the WAN. The packet having the source security zone in the header is received. The source security zone of the received packet is evaluated to determine whether to stop the packet or process the packet based on a route the received packet took in the communication network, wherein the route is based on the evaluated source security zone.

A further embodiment of the invention addresses a method for integrated firewall packet filtering based on global security zones of a communication network. An application identification (ID) is included in a header of a packet received in an input stage of a packet processing pipeline by an integrated firewall to create an updated header. Application steering to a designated service is utilized based on the application ID selected from the updated header to override routing rules that specify a different route to the designated service.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 5 illustrates an exemplary domain name system (DNS) request and response scenario containing a domain name alias (CNAME) in accordance with an embodiment of the present invention;

FIG. 6 illustrates an exemplary DNS request and response scenario that does not contain a CNAME in accordance with an embodiment of the present invention;

DETAILED DESCRIPTION

Figure 1A:
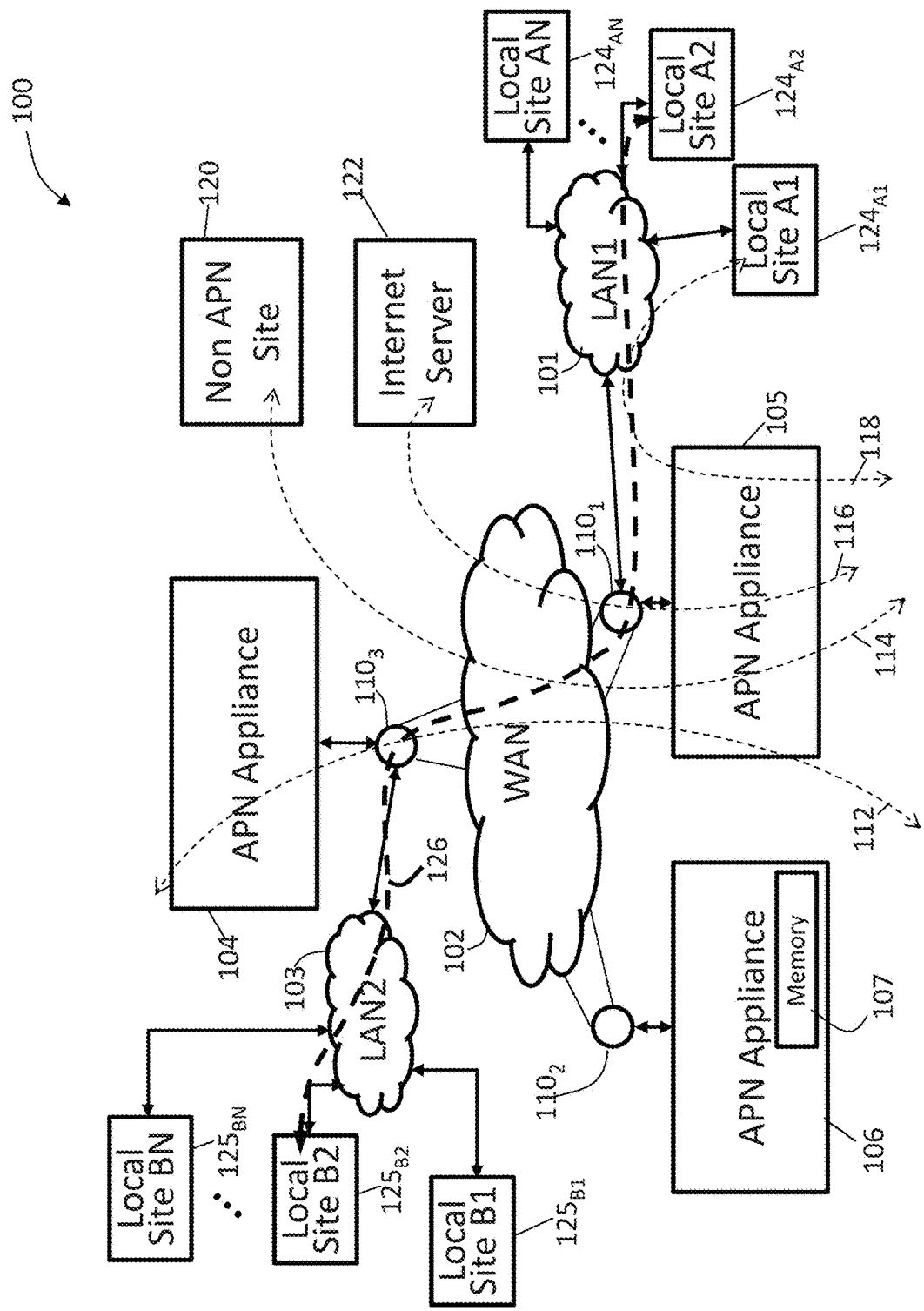
FIG. 1A illustrates an end-to-end network configured with client nodes on local area networks (LANs) coupled to a wide area network (WAN) under control of an adaptive private network (APN) showing service paths in accordance with an embodiment of the present invention.

FIG. 1A illustrates an exemplary adaptive private network (APN) 100 having local sites $124_{A1}$, $124_{A2}$, ... $124_{AN}$, local sites $125_{B1}$, $125_{B2}$, ... $125_{BN}$, on local area networks, LAN1 101 and LAN2 103, respectively, coupled to a wide area network (WAN) 102 under control of the APN showing service paths in accordance with an embodiment of the present invention. The APN 100 includes one or more wide area networks (WANs), such as WAN 102, APN appliances (APNAs) 104-106, WAN routers $110_1$-$110_3$, and network application services as well as APN conduits between APNAs, as described in more detail below. The APN 100 is configured from a single APNA acting as a network control node (NCN) that provides a single point of control for the APN. First, however, a number of terms used herein are defined with the meaning they have when used in the context of the present invention.

An APN path is a logical connection established between two WAN links located at different geographic sites across a WAN where one WAN link sends traffic to the other WAN link. Since Paths are unidirectional entities (one sender and one receiver), two WAN links that are connected to each other have two paths between them. Each WAN link sees one path as being its transmit path and the other as the receive path. The APN path is used to send user traffic under normal circumstances.

An APN conduit is a virtual connection between two APN nodes, also referred to as client sites, and formed by aggregating one or more APN paths and their allocated WAN link resources. A conduit service is a logical combination of one or more paths. A conduit service is typically used for enterprise site-to-site intranet traffic, utilizing the full value of the APN. With a conduit service, depending on configuration, traffic is managed across multiple WAN Links to create an end-to-end tunnel. The conduits overlay a virtual network on top of the underlying network.

An APN appliance (APNA) is a device that contains APN client site functionality including software modules which governs its participation in an APN. A high availability (HA) site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, representing the amount of data capacity available for transmission and reception. WAN links can be shared among APN conduits, and intranet and Internet network services. In the present embodiments, the APN appliances do not directly attach to WAN links APN appliances communicate with WAN links through logical connections, such as the WAN routers $110_1$-$110_3$ of FIG. 1A.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link (RWL) for a site B. For a conduit between a site A and a site B, site A's local WAN links are site B's remote WAN links.

An Internet service is used for traffic between an enterprise site and sites on the public Internet. The Internet is treated as a separate security zone. Traffic on the Internet is considered less trustworthy than conduit traffic in an APN because the Internet traffic has not been encapsulated and encrypted as is done in a conduit. Also, the Internet traffic is generally coming from an entity not under control of the enterprise that owns the trusted network.

An intranet service is used for any portion of enterprise intranet traffic that has not been defined for transmission across a conduit. As with Internet traffic, the intranet traffic remains un-encapsulated, and the APN manages bandwidth in the network by rate-limiting the intranet traffic relative to other service types during times of congestion. Note that under certain conditions, and if configured for intranet fallback on the conduit, traffic that ordinarily travels via a conduit may instead be treated as intranet traffic in order to maintain network reliability. Since conduit traffic is site-to-site, customers generally have a way to deliver this site-to-site traffic without the conduit. This unencapsulated service, called an intranet service, does not receive the benefits of the conduit. If the conduit tunnel cannot be brought up, then routes which use that conduit are ignored and this means that traffic that would have used the conduit are redirected to use an unencapsulated site-to-site transport method.

A flow is defined by an n-tuple consisting of <IP source address, IP destination address, IP protocol number, transmission control protocol (TCP)/user datagram protocol (UDP) source port, if the IP protocol is TCP or UDP, TCP/UDP destination port, if the IP protocol is TCP or UDP>. Depending on the context, other items could be added to the tuple including: a differentiated services code port (DSCP) tag, a routing domain, and a service identifier, and the like. Also, a flow is unidirectional. For example, if nodes A and B are communicating, there is a flow that represents traffic from A to B and a flow representing traffic from B to A.

An APN service is a set of processing steps performed on packets that are transmitted through the APN. As illustrated in FIG. 1A, data traffic that moves through the APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance (APNA) 104. The APN conduit service for path 112 operates on both APN appliances 104 and 105. The APN conduit service sends and receives data between a first geographic location that has the APNA 105 and a different geographic location that has the APNA 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APNA 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has the APNA 105 and a local site $124_{A1}$ within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

In a further embodiment, a path 126 has a first local site $124_{A2}$ connected to LAN1 101 to APNA 105 to WAN router $110_1$ through the WAN 102 to WAN router $110_3$ to APNA 104 to LAN2 103 to second local site $125_{B2}$. LAN1 101 and LAN2 103 are exemplary networks having a plurality of routers and routing paths which are managed and can change to improve network performance.

A conduit consists of multiple paths. A path is formed between 2 WAN links associated with the conduit. Each path in each conduit in the APN is monitored for quality of communication by collecting quality metrics such as packet loss and latency. This monitoring is done by way of control messages and is done on each path whether the path is used to transmit user traffic or not. Accordingly, no path is completely free of traffic unless it is not operational. Since all paths within a conduit are being measured whether there is user traffic through the path or not, the conduit maintains up to date per-path metrics that are used by the APN to select the best network path to transmit user data.

A static conduit is a conduit configured in a configuration file and created at startup time of an APNA. A static conduit is not removed without changing the configuration file.

A dynamic conduit is a conduit created between APN clients when needed and which can be removed when no longer needed. Dynamic conduits address changes in statically configured networks that are happening in real time across a network. In real time, dynamic conduits optimize network performance adapting to changing communication patterns between nodes in the network. Dynamic conduits can also be used to offload traffic from intermediate nodes experiencing congestion.

An adaptive private network (APN) software product according to the present invention runs as a centralized management system within a virtual machine to create APN configurations and to monitor system resources, analyze system resources, and manage a configured APN in operation as addressed further herein. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network.

Figure 1B:
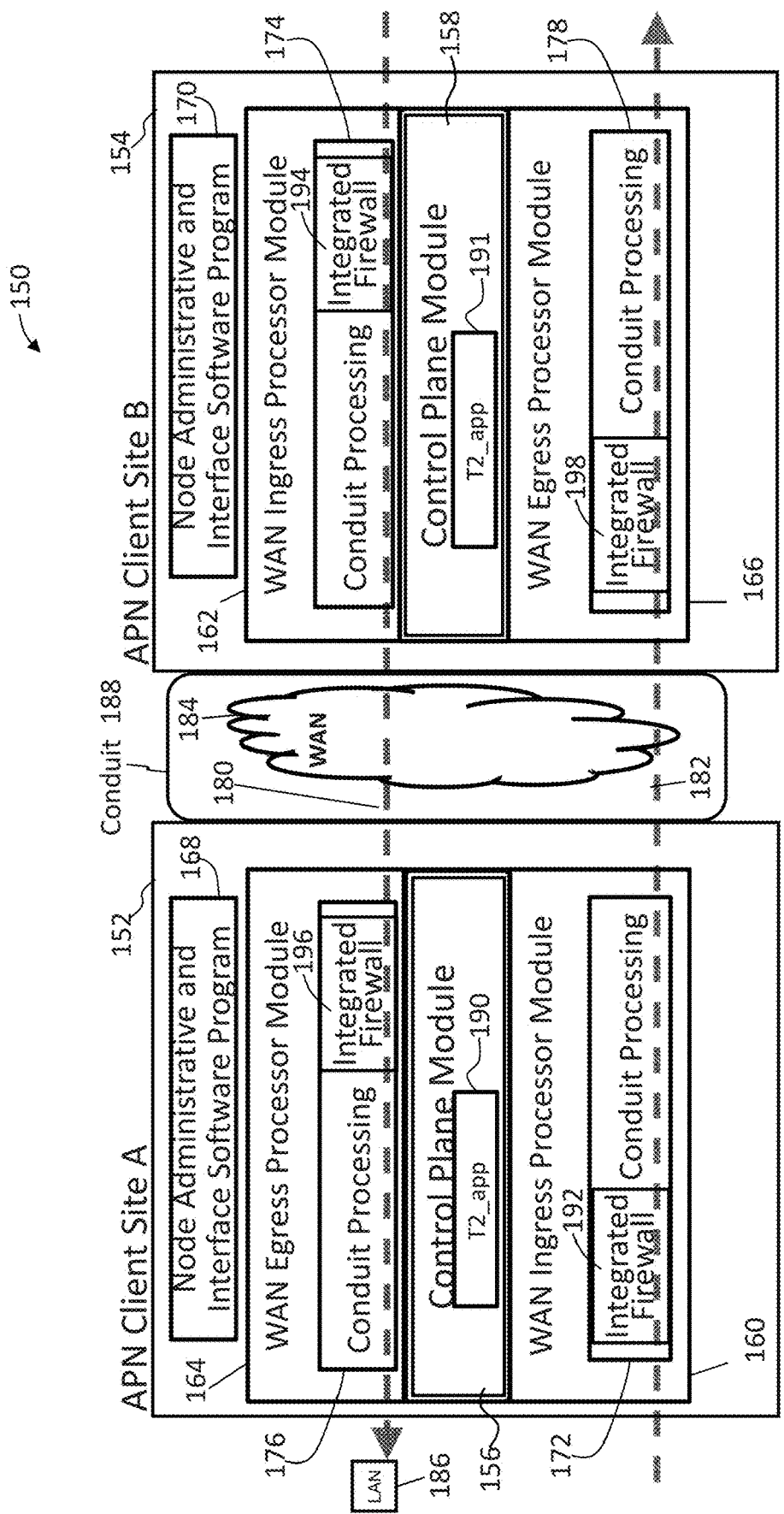
FIG. 1B illustrates an adaptive private network (APN) conduit providing two-ended service that includes integrated firewalls between a client site A and a client site B in accordance with an embodiment of the present invention.

FIG. 1B illustrates an adaptive private network (APN) conduit supporting two-ended service 150 that includes integrated firewalls 192, 194, 196, and 198 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit processing stages 172 and 174, and WAN egress processor modules 164 and 166 include a duplicate conduit processing stages 176 and 178. Advantageously, firewalls 192 and 194 are each integrated into input stages of the WAN ingress processor conduit processing stages 172 and 174, respectively. Firewalls 196 and 198 are each integrated into input stages of the WAN egress processor conduit processing stages 176, and 178, respectively. The integrated firewalls are described in further detail below. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of the one APN client site's WAN ingress conduit processing 174 to the peer APN client site's WAN egress conduit service processing 176 constitutes an APN conduit 188 in which traffic is actively monitored and managed across multiple WAN resources. Control programs, referred to as t2_apps 190 and 191, run on each APNA communicating with other APNAs in the APN while forwarding user data.

The APN is capable of using disparate asymmetric WAN links which frequently vary in behavior with respect to bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN Egress Module 166 from the send time stamp from a WAN ingress module 160, FIG. 1B. U.S. Pat. No. 8,125,907 filed on Jun. 11, 2009 entitled "Flow-Based Adaptive Private Network with Multiple WAN-Paths" and incorporated by reference herein in its entirety provides exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane modules' path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as utilized in an adaptive private network (APN) appliance (APNA), a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules supporting participation in an adaptive private network. An APN node may exist in one or more APN appliances at a location. An APN node contains a collection of software modules executed by a processor and memory complex located in the APN node which govern the APN node's participation within an APN such as control plane modules 156 and 158, WAN ingress processor modules 160 and 162, and WAN egress processor modules 164 and 166 in FIG. 1B. The control plane modules 156 and 158 are responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP) packets, that is part of change management software or through administrative interfaces, such as downloading software using interfaces 168 and 170 to the APN client sites. The TAP is a protocol for messages that are sent through the WAN to allow processes outside of t2_app on different appliances to communicate with each other. TAP can be considered a point-to-point or Ethernet like device which, instead of receiving packets from physical media, receives the packets from a user program and instead of sending packets via the physical media, writes the packets to the user program. After a software update, the APN services on the APN client sites 152 and 154 are then restarted thus bringing the APN software node configuration into synchronization.

Figure 2:
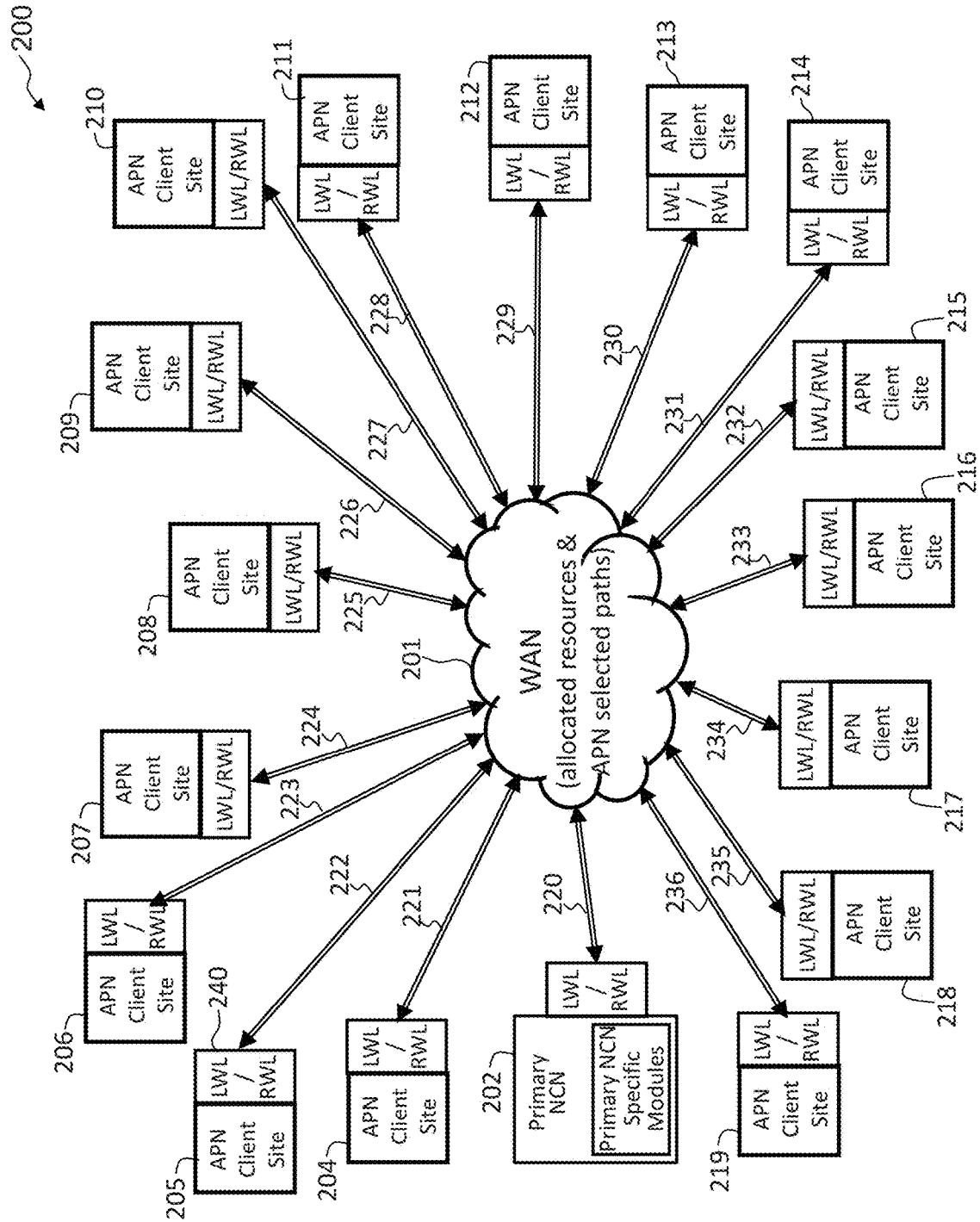
FIG. 2 illustrates an APN having an APN network control node (NCN) and sixteen APN conduits coupled to sixteen APN client sites in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a local WAN link (LWL) at site A→"WAN"→RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

The sixteen client sites 204-219 of the exemplary APN 200 are generally located remotely from each other and may include geographically diverse client sites. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane modules 156 and 158, the WAN ingress processor modules 160 and 162, and the WAN egress processor modules 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A network control point (NCP) 202 of FIG. 2 is an administration point for the APN 200. In one embodiment, the NCP 202 resides within an APN node. An APN control node refers to an APN node that also performs as the network control point of the APN. In another embodiment, an NCP resides in an appliance that is separate from an APN node and administers and controls the APN nodes within the APN. The NCP provides administrative and control to the APN, including but not limited to, distribution of configuration objects to APN client nodes and time synchronization to the APN.

A dynamic conduit is a conduit created between APN clients when needed and can be removed when no longer needed, based on a configured threshold. For example, client site 205 can be configured with two local WAN links, one from a first network provider and one from a second network provider. Multiple conduits may be connected to site 205 which may be configured to use one or both of the local WAN links In an exemplary scenario where all of the conduits that are connected to site 205 use both local WAN links, then when usage for either local WAN link passes the configured threshold, creation of a dynamic conduit can be triggered.

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes and service rules that the APN traffic flow matches. The state of APN flow record includes, but is not limited to, APN service type, APN service instance, information pertaining to the last APN path selected, current APN flow sequence number, time of last packet received, time of last packet transmitted, counts of number of packets and number of bytes processed, sets of pending packets for sequence reordering, sets of pending packets for fragmentation, and sets of historical records for packets previously processed.

Advantageously, a preferred APN firewall, referred to as an integrated firewall herein, applies a set of security policies during a route lookup processing phase. The integrated firewall also provides connection tracking so that security policies can block inbound traffic that is not a result of an outbound session initiation.

Unlike an external firewall, which may be implemented by a separate appliance, the APN firewall is integrated within conduit processing stages so that it recognizes and has access to internal information regarding the different services, such as conduit, intranet, Internet, local vs WAN, applications, and security zones, that are provided in an APN. This integration allows APN firewall policies to reference services, which an external firewall device would not be able to do. An external firewall has no ability to look inside the APN's encapsulated conduit traffic to apply security policies at conduit and packet creation levels which the integrated firewall can do. Within the t2_app control program, the integrated firewall policies are evaluated prior to encapsulating conduit traffic for transmission and are also evaluated after unencapsulating conduit traffic that has been received. An external firewall is not able to see real user traffic which resides inside an encrypted and encapsulated envelope surrounding data packets. Additionally, an external firewall would not be aware of the service type that a packet belongs to due to the encapsulation and encryption. The integrated firewall as described herein adjusts the service type dynamically based on conditions in the network, in contrast to an external firewall having a static configuration which cannot access the service type, cannot dynamically respond to the service type, and cannot dynamically update the service type.

Also, an integrated firewall allows a network administrator, for example, to see and to understand how software applications are being used in the network. Since application awareness and security functions are integrated, customers can set security policies on the software applications, as described in more detail below. The integrated firewall advantageously connects the application identification with both the reliable network services and the firewalling in an integrated system. Further, the integrated firewall with integrated application awareness is actionable to allow an administrator the ability to adjust the APN configuration to meet desired goals. For example, the APN configuration can be adjusted since a centralized configuration is stored on the NCN. This centralized configuration is compiled into individual sets of network settings appropriate for each site appliance, distributes these network settings to selected site appliances, and activates a resulting new configuration across all the selected site appliances nearly simultaneously, with allowance for transmission delays. The centralized configuration holds a single definition for one or more software applications which ensures the site appliances always work on the same set of software application definitions. The centralized configuration also holds a set of security policies that can be applied to the site appliances such that an administrator and a user can be sure that multiple sites are working of the same set of security policies.

A network administrator is constantly confronted with different events in the network that affect performance, quality, reliability, cost and the like, with increasing pressure to resolve the events quickly with limited or no reductions in service across the network. For example, an administrator may need to determine if the network can support voice over Internet protocol (VOIP) applications, if the Internet carrier link goes down. In order to make such a determination, the administrator must understand how much bandwidth the VOIP applications require. Such VOIP application bandwidth utilization data may generally not be tracked, which then makes such determination by the administrator difficult if not impossible. However, if such application bandwidth utilization data is tracked, the administrator could identify whether any bandwidth is available with the Internet carrier link gone. Further, the administrator could check rules and classes to verify that the VOIP applications are being directed to a class that guarantees enough bandwidth to satisfy the application. The administrator allows rule sets and class sets to be assigned to multiple sites in parallel from a global level.

In another example, a network administrator may need to determine whether the current Internet links which are heavily used require additional bandwidth be purchased from an Internet provider. In this case, the administrator needs to know how the Internet is being used. For example, if users are busy streaming non-work related videos, then additional bandwidth may not be warranted. For example, the concern is not about how much bandwidth the videos use. The concern is about observing that the bandwidth utilization is non-work related, in which case, there is no business value in purchasing more bandwidth for such video traffic. However, if traffic into and out of a company's sales website is driving usage, then additional bandwidth may be justified to improve users' experience and the administrator can update the traffic to this website to a higher class. If the company tracked application usage by grouping important web traffic into applications, then the usage of the Internet traffic would be understood. Such grouping of selective web traffic is determined by the administrator. Without administrator input, a network device sees web traffic as a bunch of TCP connections to many locations on ports 80 and 443. There is nothing in that data to suggest that some connections are more important than others or that some of those connections should be restricted according to a particular security policy. A network administrator is able to determine that Outlook®, for example, is important to the organization and then is able to setup a security rule that is used to identify web traffic to sites allowed to receive outlook.office.com communications. The integrated firewall then applies those administrator set security policies to that application to differentiate that traffic from all other web traffic. The administrator may also monitor network utilization of the Outlook email application. Each company has their own unique applications and security priorities, so systems need some way for administrators to determine each application's network utilization. The integrated firewall provides such capability.

Figure 3:
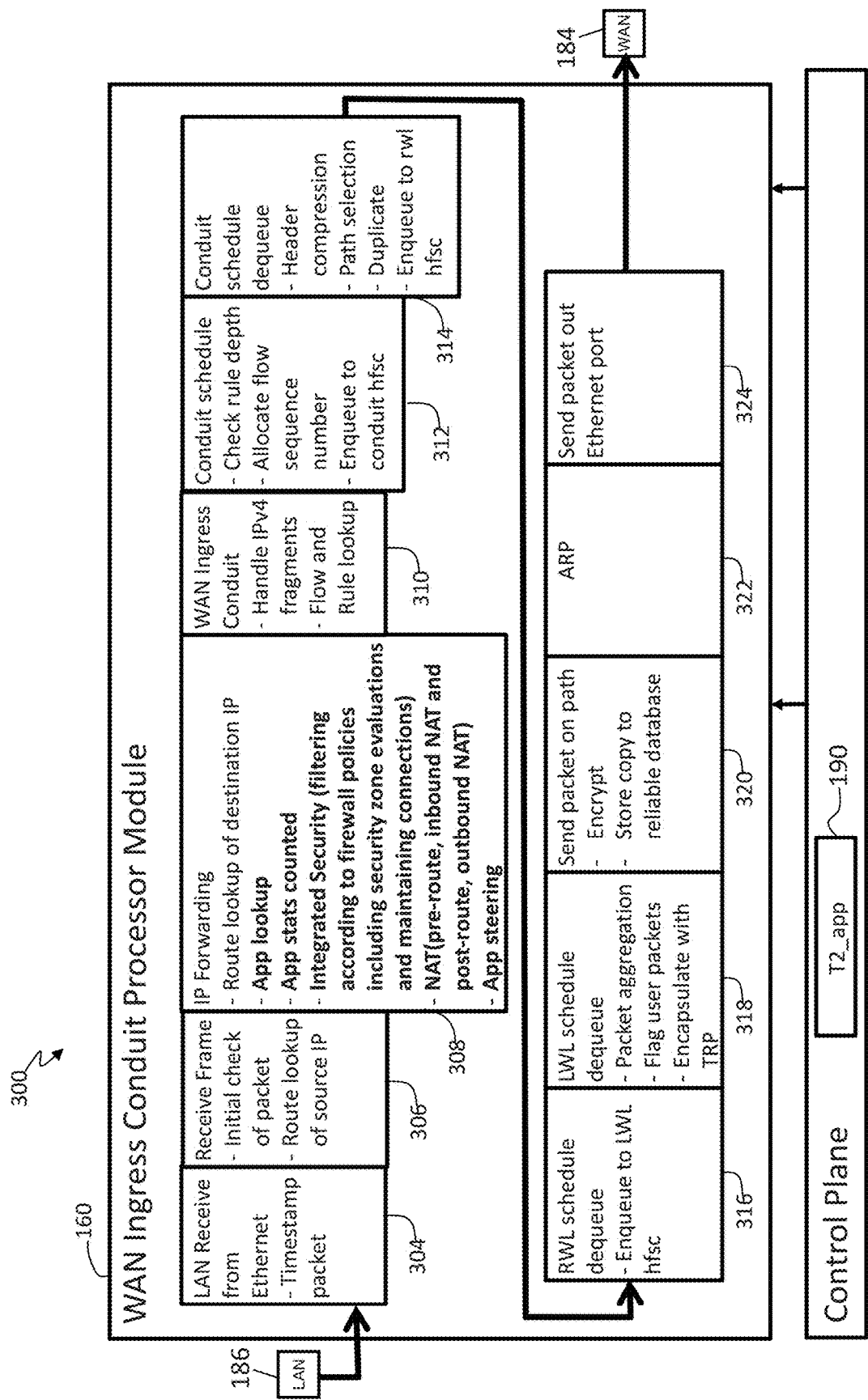
FIG. 3 illustrates a WAN ingress conduit processing pipeline in accordance with an embodiment of the present invention.

FIG. 3 illustrates a WAN ingress conduit processing pipeline 300 in accordance with an embodiment of the present invention. The bold steps of FIG. 3 are highlighted steps for the application and firewall processes as described herein. The WAN ingress conduit processing pipeline 300 includes the integrated firewall in conduit processing stages 172 and 174. Client node WAN ingress conduit service processing steps 304-324 are utilized in the WAN ingress processor modules 160 and 162. At step 304, packets from the LAN 186 are received. At step 306, an initial check of the packet is done and a route lookup on the source IP address identifies this packet came from the LAN. The IP forwarding step 308 includes processes for application (App) lookup, app statistics (stats) counted, integrated security which includes filtering according to firewall policies including security zone evaluations and maintaining connections, NAT, such as pre-route, inbound NAT and post-route, outbound NAT, and App steering. At step 308, an IP forwarding process begins that includes a lookup in an application classification table, such as Table 1, see below, to determine the application. The forwarding process also includes counting of application statistics, and starting a firewalling security process as described in more detail with regard to the integrated firewall processing shown in FIGS. 12A and 12B. Included in the firewalling security process at step 308 is providing a network address translation (NAT), including pre-route NAT and post-route NAT, and initiating application steering to destinations allowed by the security policy. The application steering allows a user to designate a service to be used for delivering the traffic. This steering to the designated service overrides how the routing rules normally deliver traffic. For example, the result of doing any route lookup is that fields of the packet descriptor are filled in which determine the destination service. The override overwrites the routing decision by putting the destination information about the override service into the packet descriptor. The application and security processing occurs primarily at step 308. Steps 310-324, represent further processing stages of WAN ingress conduit processing, see U.S. Pat. No. 8,125,907 issued Feb. 8, 2012 entitled "Flow-Based Adaptive Private Network with Multiple WAN-Paths" for further details and which is incorporated by reference herein in its entirety.

The integrated firewall 192, 194, 196, and 198 of FIG. 1B provides automatic detection of applications, for such purposes as identification and tracking of small user datagram protocol (UDP) packets arriving at regular intervals as likely being VOIP packets. The integrated firewall classifies applications based on domain names, steers traffic to services according to software applications, reports on software applications in passthrough traffic, and provides monitoring and analysis of traffic that does not match a software application so that a user can investigate and define custom applications. For example, the integrated firewall provides central application classification within a packet forwarding stage of a packet processing pipeline, such as step 308, to provide statistical reports, to determine security policies for classified applications, and to provide changes to network operations to improve the network's quality of service (QoS). QoS involves assigning a class of service to packets and setting conduit features, which include settings for load balance, persistent path, duplicate packets, reliable retransmission, egress resequencing, and the like. Such centralized application classification in the integrated firewall, allows central administrative control of monitoring, security, and quality tools.

The firewall as integrated in step 308 also provides security features such as stateful packet inspection, traffic filtering, such as allow or drop with APN provided match criteria, port masquerading and port forwarding, static network address translation (NAT), auditability of traffic filtering and NAT rules. Stateful packet inspections that is part of stateful packet filtering include capability to filter out or block TCP packets that are not part of a known TCP connection and are not initiating a new TCP connection. There is no limit to the amount of state information that network devices can utilize. Many software functions inspect sequence numbers to make sure that only "reasonable" sequence numbers are passing through the network, for example. NAT generally refers to altering only the IP address of packets. In reality, TCP/UDP ports also have to be altered as well. An example is when multiple hosts on a private network have to share a single public IP address through NAT. It is inevitable in that case that multiple private hosts will use the same TCP/UDP port number. If the NAT device can translate port numbers, then there is no problem. This is what port masquerading is generally solving. Port forwarding is similar, but it is usually used with inbound NAT so that incoming traffic can hit an external port and have port translation applied when the traffic is sent to an internal host. One example is if there are multiple hosts behind a single public IP address. Port forwarding rules may advantageously be setup so that an incoming secure shell (ssh) connection on port 2222 is sent to host A at port 22 and incoming connections on port 2223 are sent to host B at port 22.

The integrated firewall by providing such application and integrated security functions generally replaces the need for an external security device in APNs. For example, in an APN configured across 100 branch offices, 100 APNAs with integrated security would be required and the APN would require an additional 100 external security devices.

Customers desire something that is simple to manage and configure. Service chaining allows a chain of separate systems to be integrated together to combine different products into a single system. However, service chaining is not much different than using external firewall devices and does not provide the same integration and resultant capabilities as described herein with use of the integrated firewall. The integrated firewall goes beyond capabilities provided by service chaining by providing integrated security which allows applications to be defined in one place and that definition can be used to enforce security and QoS policies. For example, an integrated firewall solution implements an internal security architecture allowing simple deployments capable of replacing small office/small business routers.

Regarding applications, as described herein, a packet application is determined from a set of one or more match criteria. A successful match places an application identifier in the header of the packet when it enters the system. An application classification table is shown below in Table 1, for example. If a cell is blank in Table 1, it means that classification criteria is not used and acts as a don't care. For example, for FTP match 1, the rule says that any packet with an IP protocol of TCP and a source or destination port of 20 will match. It does not matter what domain it came from or what our heuristics say about the packet. FTP match 3 says that if our heuristics think the packet is Passive FTP, then it will match that application and it does not matter what the port number, Internet protocol, or domain are.

TABLE 1

| Application Name | Match Criteria | Heuristic Criteria | Protocol | Port | Domain |
|---|---|---|---|---|---|
| File Transfer Protocol (FTP) | 1 | | TCP* | 20 | |
| | 2 | | TCP | 21 | |
| | 3 | Passive FTP | | | |
| Secure Copy (SCP) | 1 | SCP | | | |
| Secure Shell (SSH) | 1 | | TCP | 22 | |
| Voice Over Internet Protocol (VOIP) | 1 | DSCP = EF** | | | |
| | 2 | VOIP | | | |
| Outlook Web App | 1 | | TCP | 443 | Outlook365.com |

*Transmission Control Protocol (TCP)
**Differentiated Services Code Port (DSCP) = Expedited Forwarding (EF)

When a packet is identified by the t2_app 190 on the WAN ingress processor module 160 of FIG. 1B, the packet is classified according to Table 1 by starting at the top of Table 1 and working through the various match criteria. The first matching criteria that is found causes the packet to be tagged with the application name. The heuristic criteria requires the t2_app 190 and associated system elements to monitor the packet traffic to determine whether there is a match to the specified heuristics. For example, for the passive file transfer protocol (FTP) application an FTP heuristic is used. The FTP control channel is monitored for characteristics as specified in the second heuristic of Table 1, match criteria 2 for FTP. The FTP control traffic is defined as being on TCP port 21 so the monitored packet traffic would match the second heuristic in Table 1. For the secure copy (SCP) heuristics, the traffic is monitored to detect characteristics of a file transfer that matches secure shell (SSH) traffic. Secure copy (scp) is utilized for copying a file over a secure shell (ssh) connection. So, the ssh protocol can be used when someone is keying interactively at a remote command line or when copying a file. It is desirable for the network to handle these cases differently. On a command line operation, a user is issuing very little data, often just a single keystroke, and expects to see a response quickly. This traffic is prioritized in the network because responsiveness is important and very little throughput is needed. File transfers with scp often prefer throughput at the expense of latency so it can be treated differently. If a single ssh packet is examined, no information can be found to determine if the packet is part of a file transfer or an interactive command line operation, so some heuristics are needed. For the VOIP heuristics, a match is determined by monitoring the nature of UDP traffic and/or inspecting session initiation protocol (SIP) packets that set up the media flow.

By having the control program t2_app 190 classify packets with software applications early in the receiving process, the information gained by the classification is used in later stages of the packet processing pipeline. For example, conduit rules are set up based on this information, as shown below in Table 2, for example. With regard to the rules of Table 2 as used with the application classification Table 1, VOIP is assigned to one class, HTTP is assigned to a different class, as governed by rule 2 in Table 2, and other traffic is assigned to a different class, as governed by rule 4 having a blank don't care in the match column, for example. By this classification and rules, the individual applications are able to be tracked, monitored, and reported. In another example governed by rule 3, for an Internet control message protocol (ICMP) for a situation that a user does not want the ICMP protocol packets to be resequenced, so that all packets received are delivered immediately, even if they are out of order. The WAN Ingress property is set to a persistent path setting to try to keep the ICMP packets following the same path through the network. Also, retransmit reliable is not set, so any packets lost on the WAN are not restransmitted. This can be useful if a user wants to monitor the quality of the network using ICMP pings, for example. Note that retransmit reliable is set for rule 2 and rule 4.

TABLE 2

| Rule | Match | WAN Ingress Properties | WAN Egress Properties |
|---|---|---|---|
| 1 | Application = VOIP | Duplicate Path, Class 10 | Resequence, Discard Late Resequence |
| 2 | Protocol = TCP, Port = 80 | Load Balance, Retransmit Reliable, Class 11 | Resequence, Discard Late Resequence |
| 3 | Protocol = ICMP | Persistent Path, Class 8 | No Resequence |
| 4 | | Load Balance, Retransmit Reliable, Class 9 | Resequence, Discard Late Resequence |

Advantageously, security policies can be defined for a particular application as determined from a match based on the application classification and rule tables. For example, a set of security policies defining security zones can be put into place which permits web traffic to a company's sales website and block web traffic to a social media web site. Also, application usage may be advantageously determined by use of the application classification and rule tables implemented in the integrated firewall on the forwarding device.

In order to track and monitor software applications, sufficient storage must be allocated for the expected data. Since a network may use hundreds of defined applications that may be tracked with counters on a periodic basis, such as every minute, and with hundreds of conduits providing paths to these applications in an APN, it is easy to approach storage requirements of over 3 gigabytes of data per hour. To address this data rate when a problem arises, applications per service, such as conduit, Internet, and intranet types of WAN services may be selectively tracked, though not limited to these exemplary services. For example, when a user enables an application to be monitored on a service, a list tied to the service is updated to hold an application_id to be monitored. When packets classified to match that application_id are processed by that service, counters for a number of packets and a number of bytes are incremented. There are also counters tied to a combination of the application and service, which are enabled by use of a tuple of the application_id and the service_id. These counters are then made available on a user interface (UI) in a manner similar to other counters that are monitored.

This capability of selective tracking of applications per service is provided for monitoring and for troubleshooting problems at a small number of individual sites. This approach collects detailed information at a granular level that is sufficient for evaluating at a specific site. Each APNA, is programmed to allow users to enable application monitoring of a small number of services, such as one to three services. This reduction in monitoring requirements allows real time monitoring of the applications on each selected service. The amount of data storage required would be reduced by more than two orders of magnitude. The monitoring information provided would allow a network administrator to determine what service is consuming bandwidth on a particular conduit. Monitored data from these selectively tracked services may also be stored for longer periods of time to enable a more historical evaluation of the monitored data. Such data is made available to the centralized management system, which provides analysis and monitoring capabilities that are timely with respect to events to be tracked and monitored while the APN is in operation and provides storage for historical data.

Monitoring counters per application include a transmit (Tx) bytes counter, a Tx packets counter, a receive (Rx) bytes counter, a Rx packet counter, and a number of sessions counter. The Tx and Rx counters are utilized with the WAN service so that incrementing a Tx counter indicates application data was transmitted to the WAN and incrementing an Rx counter indicates application data was received from the WAN to track how applications are using the WAN.

The application classification and rule tables, such as Table 1 and Table 2, provide a basis for tracking a number of sessions that belong to a software application. Tracking the number of sessions for an application requires tracking the number of connections that belong to that application. A connection generally passes many packets which would be too large a number to simply count the number of packets that belong to an application. When a packet is processed, it can be determined what connection the packet belongs to. If that connection has not been counted against the application, then a session counter on the application object is incremented and the connection is marked as having been counted against an application. Future packets for that connection will then not increment the application's session counter. A connection database is used to keep track of the state of connections, including associated applications, in the APN. This connection database is used to enforce security in conjunction with tracking the number of sessions per application.

Client networks will likely have a lot of traffic that does not match application data stored in the application classification and rules tables. Traffic that does not find a match in the application classification and rules tables is tracked as an unknown application or unknown applications. Unknown applications are tracked using specially defined data. For example, a category of top ten talkers by bandwidth identifies the top flows by IP addresses, protocol, and port numbers that use the most bandwidth. Another category of top ten IP addresses by bandwidth identifies the IP addresses, such as a host, that used the most bandwidth. Another category of top ten IP addresses by number of sessions identifies the IP addresses, such as a host, that are involved in the most sessions. Another category of top ten IP addresses and ports by bandwidth identifies the IP address and port combination, such as a server, that uses the most bandwidth. A further category of top ten IP addresses and port by number of sessions identifies the IP address and port combination, such as a server, that is involved in the most sessions. These types of traffic are tracked on a daily basis, for example to identify hot spots that may need to be further evaluated and corrected.

Figure 4:
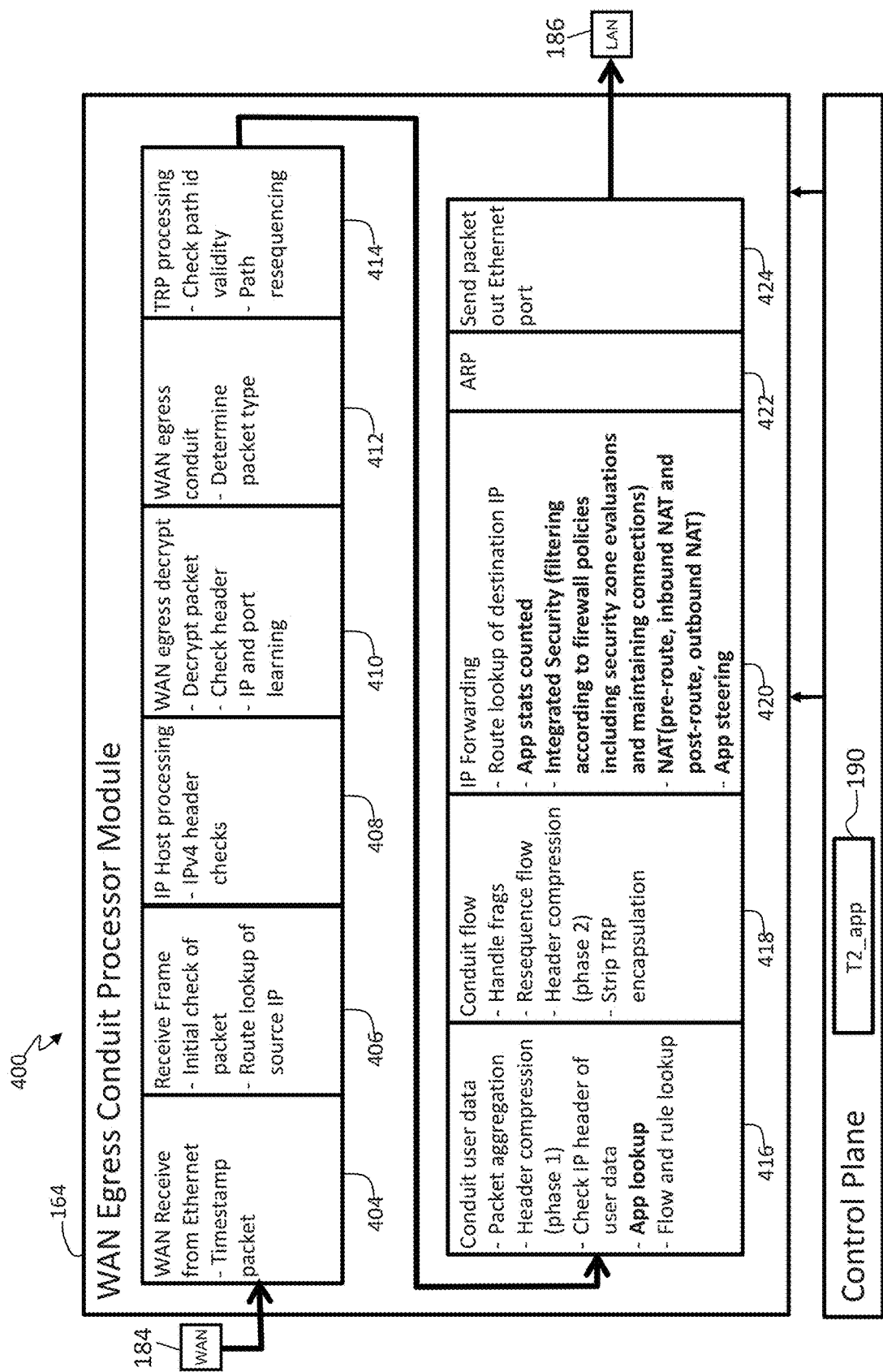
FIG. 4 illustrates a WAN egress conduit processing pipeline in accordance with an embodiment of the present invention.

FIG. 4 illustrates a WAN egress conduit processing pipeline 400 in accordance with an embodiment of the present invention. The bold steps of FIG. 4 are highlighted steps for the application and firewall processes as described herein. The conduit user data step 416 includes an application (App) lookup. The IP forwarding step 420 includes processes for app statistics (stats) counted, integrated security including filtering according to firewall policies including security zone evaluations and maintaining connections, NAT, such as pre-route, inbound NAT and post-route, outbound NAT, and App steering. The WAN egress conduit processing pipeline 400 includes the integrated firewall in conduit processing stages 176 and 178. Client node WAN egress conduit service processing stages 404-424 are utilized in the WAN egress processor modules 164 and 166. At step 404, packets from the WAN 184 are received. At step 406, an initial check of the packet is done and a route lookup on the source IP address identifies that this packet came from the LAN. At step 408, IP host processing is started with Internet protocol version 4 (IPv4) header checks. At step 410, WAN egress decryption is begun decrypting the packet, checking the header, and learning the IP and port. At step 412, WAN egress conduit processing is begun with a determination of the packet type. At step 414, transport reliable protocol (TRP) processing is begun including checking path id validity and path resequencing. At step 416, conduit user data processing is begun including packet aggregation, phase 1 of header compression, checking IP header of user data, application lookup using an application classification table, such as Table 1. Also, a flow and rule lookup in a rules table, such as Table 2 is accomplished. At step 418, conduit flow processing is begun including handling fragmentation, resequence flow processing, phase 2 of header compression, and strip TRP encapsulation.

The APN conduit service allows the packets of a single flow to be spread across multiple WAN links. This spreading means that the packets could arrive at the far end of the conduit out of order because different paths have different latencies. Also, there could be packets lost that were retransmitted which generally results in out of order arrivals. In order to not deliver out of order packets to a user, the receiving end of a conduit uses resequence flow processing to put the packets of a flow back into their proper order using a flow sequence number that is in the conduit encapsulation.

At step 418, the security zone of the packet is determined based on data in the TRP encapsulation. At step 420, IP forwarding processing is begun including routing lookup of destination IP, counting of selected application statistics, a forward stage firewalling security process is started, as described in more detail with regard to the integrated firewall processing shown in FIGS. 12A and 12B. The IP forwarding processing at step 420 also includes network address translation (NAT), including pre-route NAT and post-route NAT, and initiation of application steering.

The application steering allows a user to designate a service to be used for delivering the traffic. This steering to the designated service would override how the routing rules would specify to normally deliver traffic. The override overwrites a routing decision by putting the destination information about the override service into the packet descriptor. Since the rule lookup requires knowledge of the packet's application, the application lookup happens in step 416, the conduit user data processing. This processing is accomplished by embedding the looked up application ID number in the flow header, such as during the encapsulation with TRP step in step 318 of FIG. 3. While this processing takes additional overhead in the conduit encapsulation, it makes the application lookup quick on the WAN egress side and guarantees that the application that is applied is consistent with the WAN ingress side. At step 424 the packet is sent out to the LAN, such as by use of an Ethernet port.

It is noted that the application and security processing is generally accomplished in a single stage at step 308 in the WAN ingress conduit processing of FIG. 3 and at step 420 in the WAN egress conduit processing of FIG. 4. The processing pipeline for both Internet and intranet traffic utilizes an IP forwarding stage, such as step 308 in FIG. 3 and step 420 in FIG. 4, since that stage has all the information needed for application and security processing. Preferably, the IP forwarding stage is implemented through the use of multiple threads which have dependencies on which service the traffic belongs to.

Since the application match criteria as stored in an application classification table, such as Table 1, can specify a domain name, it is appropriate for the data plane to match an arbitrary IP packet with a domain name. One approach to address this domain name matching requirement is referred to herein as domain name system (DNS) snooping. Most applications on a network need to do a name lookup to map a name to an IP address and this requirement causes a DNS request to go out to the WAN. The response to this DNS request passes through a control program, such as t2_app 190 and 191, allowing the t2_app to do the snooping and store the mapping of the requested name to a set of IP addresses. The DNS response includes the information contained in the DNS request so the t2_app does not have to monitor the DNS requests to be able to learn IP addresses.

An alternative approach to address this domain name matching requirement is to configure an APNA as a domain name system (DNS) server instead of snooping the DNS traffic passing through the appliance to watch for a matching DNS name. In this APNA as a DNS server configuration, devices send DNS requests to the APNA and the APNA forwards those requests to the WAN as they came directly from the APNA. This approach advantageously guarantees that DNS replies will come back to the APNA. Hosts on the LAN get configured to send all DNS requests to the APNA in this mode. This guarantees that all DNS traffic is sent to the APNA. With DNS snooping, the network could get configured in such a way that the APNA does not see the DNS requests. The APNA, as a DNS server, also works in configurations where there is no other network appliance that host systems could use for a DNS. This is the case for the home router that most people have at home, and the APNA with integrated firewall is capable of serving those types of functions.

This DNS server configuration uses a DNS proxy to find out a domain name and IP address matching. An application is identified through an app lookup in step 416 using the domain name and then service steering uses an override service. Path steering uses an appropriate conduit rule. The APNA is configured to be a DNS server using the following rules, for example:

A user can define an application using a domain name as a match criteria instead of using network IP address 1 and network IP address 2. The domain name can be something like Facebook®, facebook.com, Outlook®, for example.

For a user to configure a domain name match in an application definition, the user enables the DNS proxy.

To configure the DNS proxy, a user should specify DNS servers for each routing domain.

If the dynamic host configuration protocol (DHCP) server is enabled at the site, the DHCP primary DNS or secondary DNS can also be set to an APNA virtual Internet protocol (VIP) if the DNS proxy is enabled. This way, all LAN hosts receive the IP address and send a DNS request to the APNA.

For each routing domain, up to a preset number "A" of default DNS servers, such as two default DNS servers, can be configured. Also, up to a preset number "B" of pairs of override DNS servers, such as eight pairs of override DNS servers, can be configured. Each pair of override DNS servers supports one specific domain match.

A default DNS server can also be set as using a DHCP client learned DNS server. Many WAN link providers expect a WAN link router to act as a DHCP client and the link provider has a DHCP server that provides configuration information for the network. This information includes an IP address to be used to access the WAN, a gateway IP address to access the WAN, and DNS IP addresses to be used to resolve DNS requests. The APNA uses the DNS IP addresses provided by the DHCP server as its default DNS server.

When a DNS request is received, if the queried domain name matches any of the override DNS server's match domain, the DNS request is forwarded to that specific override DNS server associated with the match. Otherwise, the default DNS server will be used. The DNS request is sent out round robin between primary and secondary DNS server. If no reply is received from a DNS server, that DNS server is marked as "Down", and a retry is attempted in a preset period of time, such as in five minutes.

User can configure the override service for conduit, Internet, and using an intranet rule.

For security reasons, if no matching query is found, the packet is dropped. This is about how DNS replies are handled. When a DNS reply is received in an APNA, a determination is made whether a DNS request was sent that matches that reply. The APNA verifies that the DNS request matches a reply whether the user enables the firewall or not. If the DNS reply is for a request that the APNA didn't make, then the APNA drops the DNS reply. Also, each DNS request and reply goes through the integrated firewall. For packet flow, a DNS process thread is set up to handle DNS events. When a DNS request packet is received that is destined to a t2_app's VIP, it is sent to an IP host process (ip_host_process( )). A check is used to determine if the received packet is a DNS packet and if it is a DNS packet, the received packet is sent to the DNS process thread.

If a DNS query packet is received, a determination is made whether a QID source port is used. The QID is, for example, a 16-bit query identifier (ID) located in a DNS packet header and the source port refers to the UDP source port of the DNS query packet. If the QID source port is used, a new QID is created, the source port for a packet is forwarded to a DNS forwarder process. The query is referencing a QID and a source port as a tuple {QID, source port}. When a DNS packet is transmitted out of the WAN, the {QID, source port} is required to be unique so that it doesn't match some other {QID, source port} already in use. For example, some other host could have sent a DNS request with the same query tuple information. If that tuple is already used, a new {QID, source port} is created as a key for the DNS query record that is stored. A record is created with the new QID and source port if no record already exists. The original QID, source port, Qname, class, and type are saved so that they may be used for matching with a reply message. A determination is made to pick the appropriate forwarder for the request. The packet's source IP, destination IP, source port, QID, and related checksum are updated. A record is created for the DNS request, using the host IP and domain name, and a timer is started.

If a DNS reply packet is received, a search is conducted to find a matching record based on the reply QID, destination port, Qname, class, and type. If no record is found, the reply packet is dropped. For a type A reply, if the Qname matches the domain name used by any application, then the DNS reply packet is further parsed to obtain the IP addresses, save the obtained IP addresses of the application ID. The type A reply refers to a type of a DNS record that is returned in a reply. The A record refers to the address for a name. Also, the packet source IP, destination IP, destination port, QID, and related checksum are updated. The DNS reply packet is set back to the original requestor who sent the DNS query packet, the timer is stopped, and the DNS recorded freed. Whenever the timer expires, the DNS forwarder state is updated and the DNS record is freed.

An application is identified through an app lookup in step 416 using the domain name and then service steering uses an override service. Path steering uses an appropriate conduit rule. By using application rules, an application is determined if a domain name is specified. For the DNS forwarder, for each routing domain, a user can configure a number X of default DNS servers, such as two default DNS servers, and Y pairs of override DNS servers, such as eight pairs of override DNS servers, for example. The Y pairs of override servers, each work for a specific domain match. If the DNS request matches the pair's configured match_domain, the DNS request is forwarded to this pair's associated servers in round robin. Otherwise, the DNS request is forwarded to the default DNS servers in round robin. Alternatives to using a round robin technique may also be used to spread the load across the available DNS servers. Each sever has a state, which is initialized to "up" state at t2_app start time. When a DNS query packet is sent to that server, a last sent timestamp is updated. When a DNS reply packet is received, a last received timestamp state is updated and its state is set to "up". If a query request timer expires, the server state is changed to "down". Also, the last state change timestamp is recorded. When trying to pick a sever to forward a DNS query, the following steps are followed:

Beginning with a search of the override DNS servers. If a Qname matches a server pair's match_domain, then in response to the match use the searched override server pair. Then pick one of the searched override servers in the pair to forward the request. If no override DNS server pair matches the DNS query Qname, then use the default DNS server pair. To pick which server to use in the default DNS server pair, pick the one not used for the last DNS query. If the server is up, use it and mark this server as last used. If the server is down for longer than a first predetermined time, such as 5 seconds, and the time when the last packet was sent to this server is longer than a second predetermined time, such as 5 seconds, then pick this server. Update last sent timestamp, so that other requests will not be sent to this server and mark this server as last used. Otherwise, use the last used server.

Service steering to a security policy that identifies allowed destinations using a rule override service is supported at the WAN ingress when doing firewall processing. The WAN ingress uses a flow table to get the flow created. If the flow has override service, the WAN ingress changes to that service and outbound NAT and filtering operations are processed using the overridden service.

Unfortunately, DNS responses could be forged, so the t2_app, such as t2_app 190 or 191, tracks DNS transaction identifications (IDs) of DNS requests having request names that might be of interest. This approach advantageously allows forged DNS responses to be identified and ignored. The list of applications with domain names is known in the early pipeline stages of the WAN ingress conduit processing, as shown in FIG. 3, so only DNS requests and responses that contain names of interest need to be stored.

The application look up at step 416 is considered an early stage of the pipeline for handling the user's packet. The steps prior to step 416 mostly deal with unencrypting and unencapsulating the packet. By step 416 the original packet is available and the application lookup can be accomplished. For the WAN egress code path, the application lookup is done using the application ID that is in the TRP header. The application match criteria of WAN ingress and WAN egress flows of a connection should both match the same application. For example, different directions of a connection do not match to different applications.

FIG. 5 illustrates an exemplary domain name system (DNS) request and response scenario 500 containing a domain name alias (CNAME) in accordance with an embodiment of the present invention. In FIG. 5, a DNS request 504 for mail.google.com was sent. A DNS response 510 is received that provides a CNAME record 512 which specifies that mail.google.com is an alias for the canonical name of googlemail.1.google.com. The DNS response also includes a type A address record 514 which specifies that googlemail.1.google.com maps to address 216.58.219.229. Based on this, the t2_app has sufficient information to determine whether an arbitrary IP packet would match the domain of mail.google.com.

FIG. 6 illustrates an exemplary DNS request and response scenario 600 that does not contain a CNAME in accordance with an embodiment of the present invention. In FIG. 6, a DNS request 604 for mail google.com was sent. A DNS response 610 is received that provides multiple A records, two are shown. This DNS response 610 corresponds to a DNS request for fedoraproject.org. The full response returned 9A records, each pointing to a different IP address, two are shown.

The DNS responses 510 and 610 are generally considered common type of responses and are indicative of what is seen on the Internet. DNS responses generally vary in the number of CNAME and type A address records that are returned. For example, a lookup of outlook.office365.com returns three CNAME records and seven type A address records.

The CNAME and type A address records have time to live (TTL) fields 516 and 518, respectively, that specify, in seconds, how long a record should be considered valid. Current DNS records often have very small TTL values for type A address records. In examining DNS responses across a range of Internet servers, TTL values over 200 seconds were rare and values less than 1 minute are very common. This short life span means for classifying applications based on domain names, that while the t2_app could misclassify some traffic at startup if the t2_app did not see DNS responses, the response information should get corrected quickly as DNS requests are resent on a regular basis.

There are some potential problems that may occur when doing domain matching which is used in matching applications based on domain name. One problem is that if DNS responses do not go through the APNA, then a matching domain could not be found. By use of DNS counters and user interface (UI) pages that report cached name values, this problem would be detectable if this is happening. A second problem is that some DNS requests could get redirected to a local server where a different IP address is returned. This redirection is common in guest wireless networks to force authentication to a server prior to allowing Internet access. If the t2_app saw that traffic, it could misclassify some traffic. However this problem as well as the first problem would be detectable and corrected since the correct DNS response should be seen in a reasonably short time.

If t2_app sees the destination IP of the proxy, it is desirable to be able to identify salesforce.com traffic. It is possible that the use of transparent proxies means that this case can be ignored. It is possible for an enterprise to have a local proxy to the web that all traffic flows through. The enterprise could configure the web browsers to send all traffic to the proxy IP address. If the proxy is on the WAN side of the APN, then web traffic for all sites would appear to live on the proxy IP address. In many cases, companies with proxies generally run a transparent proxy. In this case, web traffic runs through the transparent proxy, but the web browser is not configured to send the traffic to the transparent proxy. As far as the browser is concerned, there is no proxy as the interception of traffic is happening transparently. As described herein, it is assumed that any proxies in the network are transparent to the APN. There is no problem with transparent proxies. If browsers are configured to use a proxy, then it may not be possible to identify the domain name for application matching purposes. If the proxies are not transparent, then the domain name matching may not work correctly. Some use cases may set a default action of Drop and then policies specified by a user serve as a whitelist to allow packets in. The default action is taken if the packet does not match a user-specified policy. So, if the user lists a bunch of policies with an action of Allow and a default action of Drop, then packets which match the policies (the white list) get forwarded and everything else is dropped. This is useful when a user wants to limit the use of a network to very specific types of traffic. In other cases, a default action of Allow will be set and then the security policies serve as a blacklist to block known-bad packets. The default action is taken if the packet does not match a user-specified policy. So, if the user lists a bunch of policies with an action of Drop and a default action of Allow, the packets which match the policies (the black list) get dropped and everything else is allowed. This is useful when a user wants to allow a wide range of traffic, but prevent very specific uses of the network.

To provide a proper framework for describing the integrated firewall and security features, the t2_app 190 controls the IP forwarding process, such as at step 308 in FIG. 3, to track connections though the IP forwarding process in a stateful manner. Connections are tracked in both directions, such as controlling the IP forwarding process at step 308 in FIG. 3 and step 420 in FIG. 4, using a single connection object and a hash table for fast lookups. A light weight hash table (LWHT) data structure is used to hold a connection hash table. A connection is identified using connection information including routing domain, source/destination IP addresses, IP protocol, and source/destination port (for TCP and UDP protocols). The hash table has two entries per connection comprising one key for each direction of the packet. Since each packet arrives in the IP forwarding step, the keys are built with knowledge of applicable network address translation (NAT) rules.

A connection object, such as contained in Table 3 below, maintains information pertaining to a single connection. The connection hash table contains a set of all connection objects.

TABLE 3

| Name | Description |
|---|---|
| Routing Domain ID | Identifier of the routing domain the connection belongs to. Only packets belonging to a matching routing domain are checked against this connection. |
| Originator Inside IP Address and Port | The post-NAT IP address and port of the originator of the connection. |
| Originator Outside IP Address and Port | The pre-NAT IP address and port of the originator of the connection. |
| Responder Inside IP Address and Port | The post-NAT IP address and port of the responder of the connection. |
| Responder Outside IP Address and Port | The pre-NAT IP address and port of the responder of the connection. |
| IP Protocol | The IP protocol (TCP, UDP, ICMP, etc) of the connection. |
| Connection Start Time and Connection State (based on the IP Protocol, Stateful tracking includes TCP, UDP and ICMP) | The time the connection started. The current state of the connection. See section 13.2.2.4 for state values. |
| Last Connection Activity Time | Time the system last received packets for the connection. |
| Route Record and Route Table Version for each direction | By storing the route the connection will take, the current route hash table is eliminated in the forwarder to save resources. |
| Application ID | By storing the Application ID of the connection, the number of Application lookups in the forwarder is reduced to once per connection (unless heuristic processing is implemented) |
| Filter Actions for each direction | The actions that the relevant integrated firewall policy specifies for this connection. |
| Counters for packets and bytes in each direction. | Connection accounting for multiple counters |
| Indexes to NAT and filter policies. | Indexes into NAT and integrated firewall rule tables to point to the relevant policies. |
| WAN link index when Internet Load Balancing is used. | Track which WAN link this connection uses for Internet traffic for which Internet Load Balancing is used. |

A connection hash table is stored for each routing domain to contain resource utilization. An entry in the connection hash table contains a reference to a connection object, Table 3, and the match function returns a Boolean comparison result indicating whether the match was for the originator or for the responder. The Boolean comparison result is used by NAT processing to determine which rules need to be applied. In order to identify connections without prior knowledge of direction, a hash table key is comprised of the routing domain ID, originator IP address, responder IP address, IP protocol, whether the IP protocol is TCP or UDP, originator port, responder port, and sequence ID if IP protocol is ICMP and the ICMP type uses a sequence ID. A hash table key is a generic term for how to access data in a hash table. Fundamentally, a hash table process maps a key to a value.

To identify the state of a connection, it is important to know what constitutes a connection and that is determined by the IP protocol. For example, TCP has a SYN, SYN+ACK, ACK handshake, but UDP does not use such handshakes. This information, including knowledge about TCP and UDP connection characteristics, is used to direct the packet into the proper connection tracking code based on the IP protocol. The packet is processed with different connection tracking functions depending on the IP protocol.

When no network address translation (NAT) is in use, a single hash table key is sufficient to identify a connection from either direction. To identify a connection, the key is not ordered by originator and responder, but instead by a numerical comparison of the IP addresses. An n-tuple of the form: <IP1, IP2, Port1, Port2> is passed to a hash function as a parameter. The order of IP addresses and port numbers will change the output of the hash function. Since the system requires the flows of each direction of a connection, hash to the same entry, an exemplary method is used to build the n-tuple in a way that source and destination data in the packet can be swapped and still generate the same hash entry. For example,

- If the originator IP address is less than the responder IP address, the originator IP and port, if applicable, is hashed first.
- If the originator IP address is equal to the responder IP address and the originator port is less than the responder port, the originator IP and port is hashed first.
- Otherwise, the responder IP and port is hashed first.

If NAT is used for a connection, two keys are used in the connection hash table. Each key is used to match a packet from one of two directions. To simplify code, the same hash ordering is used as described above.

In an exemplary embodiment, each connection object table 3 entry uses 312 bytes, including send and receive counters for each connection. The size of the connection object table allows tracking for at least the number of flows in the APN. The t2_app tracks separate flow databases for conduit and Internet/intranet traffic, each sized according to a platform's capacity. Each connection hash table entry requires 32 bytes and each connection may have two entries. The connection hash table requires 72 bytes per bucket. Buckets is a term that is commonly used with hashing data structures. The hash function generates an index number. That index number is used to jump to a bucket in an array of contiguous buckets. Access of a bucket in this manner is extremely fast and the cost of this access is basically just the cost of running the hash function. The bucket holds a list of entries, since multiple flows could hash to the same bucket index. The assumption is that a hash function distributes flows evenly across bucket indexes and that there are enough buckets that collisions, such as reaching a specified max length of a list held by the bucket, are minimized In an ideal hash table, each bucket has only one entry. However, in this exemplary embodiment, to balance performance and memory usage, an average depth of between four entries and eight entries, if every connection uses NAT, is assigned.

The connection hash table itself is purely a container for the buckets, free hash table entries, and settings. Each bucket maintains a linked list of entries protected by a read/write lock. Entries are sorted by their hash value in ascending order. For an entry that does not exist, it is always possible to search the entire linked list of a bucket, however, sorting the entries by hash value allows exiting the bucket early in some cases. Each entry contains a pointer to the next item in the list, a pointer to the key/hash material, a pointer to the data to store in the table, and the original hash value that was used to create entry and determine the bucket.

An important aspect of the integrated firewall functionality is built on the connection object and connection tracking. A connection is essentially a pairing of two unidirectional flows comprising both direction of a session. A session is defined using the canonical five tuple (source and destination IP address, IP protocol, and source and destination port). For the purposes of NAT tracking, connections for ICMP use sequence identifiers, when available, to distinguish ICMP sessions.

To simplify lookups, tracking, and reporting, the integrated firewall tracks both directions of a connection as a single object. Information in the connection is stored as "from_origin" (in the direction from the originator to the responder) or "from_responder" (in the direction from the responder to the originator). To identify connections at all possible stages, including pre-route NAT, forwarding, and post-route NAT, the connection object maintains three keys used for hashing and connection matching. Additionally, as a means to limit the work needed for each packet after a connection is established, the connection object maintains route, NAT, and filter information.

The connection is identified by one or more connection keys stored in the connection object. The connection object stores multiple keys that are used to lookup connections in the connection hash table. The connection keys contain the necessary information to identify the connection and generate the hash value for the connection hash table and are used to assist translating packets when NAT is enabled.

The connection object has three keys, only one of which must be used. The first key, also specified as "key", is required to be set and is used to identify the connection information as it would be forwarded/routed. This key is also an intermediate translation link between a pre-route NAT and a post-route NAT, if rules exist at both stages. This key is further used in the connection hash table to identify packets for a connection if no NAT is present or if only one stage of NAT is configured. The second key is specified as "from_origin_nat_key" which is set when packets coming from an originator would be translated at the pre-route NAT stage. When this from_origin_nat_key is set, it is used in the hash table to identify packets from the originator. The third key is specified as "from_responder_nat_key" which is set when packets coming from the responder would be translated at the pre-route NAT stage (Note: despite it's name, this key is actually configured on the first packet from the origin during the post-route NAT stage). When this from_responder_nat_key is set, it is used in the connection hash table to identify packets from the responder.

Note, because these keys are used as hashing and match criteria for the connection hash table, once these keys have been used as connection keys in the connection hash table that stores connections they must not be modified until after their removal from the table. The connection key structures are a union of all possible keys for tracked protocols. All keys begin with a common key, which contains the IP protocol and allows differentiation of the form which the key takes.

Connection objects are maintained using a small number of global objects:

A connections_free_list is a singly linked list of unused connection objects. During t2_app initialization, supported connection objects are allocated and added to the free list. New connections allocate from the head of the free list and deleted connections are returned to the tail of the free list.

The connection_hash_table which is a light weight hash table (LWHT) object that owns all connections while they exist. The connection_hash_table is the sole owner of a connection object for each connection that exists, so it owns all of the connections. Generally, the connection hash table does not share ownership of the connection with other structures in the system. A connection is identified in the table by the keys appropriate to NAT rules as described above. Note: It is important to state that when NAT is configured for a connection, the connection has two references in the connection hash table comprising one key for each direction of the packet.

A connection proto functions, specified as connection_proto_fns, is an array object with function pointers, indexed by IP protocol, and used to provide protocol specific functionality. The structures include protocol specific functions for connection initialization and deletion, population and hashing of connection keys, and protocol tracking. For example, four protocol structures are defined:

A connection_proto_generic_fns structure is used in processing any connection using an IP protocol that is not otherwise defined.

A connection_proto_icmp_fns structure is used in processing ICMP connections.

A connection_proto_tcp_fns, structure is used to process TCP connections.

A connection_proto_udp_fns structure is used in processing UDP connections.

Connection tracking is generally performed with a single API, find_and_update_connection( ), which is the entry point for connection and firewall behaviors. See FIGS. 12A and 12B: integrated firewall process for a graphical representation of find_and_update_connection( ).

Find_and_update_connection( ) is broken up into multiple stages including:

Fragment Processing: In order for fragmented packets to be properly processed by the integrated firewall, the system identifies the fragmented flow to which fragments are processed at steps 1204 and 1206. To accomplish this, the flow seek key and fragment databases are used to hold fragments at step 1206 until the first fragment (frag) is received. Two new traffic types have been created to identify and route traffic back to connection tracking: IP_HOST_TRAFFIC and IP_FORWARDER_TRAFFIC. These two traffic types control where stored packets are routed after fragmentation and connection processing. Once released and processed through the integrated firewall, stored fragments are passed from step 1206 to do_ip_host_processing( ) or do_ip_forwarding( ) as appropriate, both of which provide the path leading to step 1210. Step 1202 is called when other fragmented packets are received. When the first fragment (frag) of the IP datagram is received, then the packets held at step 1206 get released to step 1210.

Connection Lookup: Following fragment processing, the security zone of the input service, set ingress security zone at step 1210, is determined and the flow seek key is used to generate a connection key used to lookup up connections in the connection hash table. If no connection is found and the packet is an ICMP error message, such as destination unreachable, source quench, redirect, or time exceeded, the inner header of the ICMP message is used to find a related connection, at step 1214. If the packet is not an ICMP error or is not related to an existing connection, an initial route lookup is performed, at step 1216. If the destination service is passthrough, determined at step 1218, the find_and_update_connection( ) stops processing at step 1220.

Pre-Route NAT: Pre-route NAT is described further below.

Route Lookup: Since the forwarding of a packet and the final destination, including a security zone and service type, is required information to the integrated firewall, route lookups, such as at step 1216, are provided by connection tracking. Step 1272 in FIG. 12B is where connections are created. When processing a packet at step 1212, if a connection exists, which connection would have been created by a previously received packet, then the process 1200 continues to step 1224 and does not reach step 1216. A function, update_route_info( ), is provided at step 1226 which caches information on the connection in a structure, defined by connection_route_info_t. Each connection has two copies of this structure to route traffic from the originator and from the responder. In addition to the current functionality, which also operates in the IP host process, the route lookup operating in the integrated firewall, includes multicast open shortest path first (OSPF) hello messages. Normal processing attempts to classify all multicast messages as passthrough application messages. If the OSPF routing protocol is enabled on the appliance, then the multicast OSPF hello messages are intercepted. These messages are intercepted by having the route lookup set this packet with an IP_HOST destination route. That designation causes the packet to be sent to t2_app's IP stack for processing instead of for forwarding.

To prevent excessive route lookups, the connection maintains knowledge of the route map version and eligibility flags. A new route lookup is performed if the version of eligibility flags change or if a new pre-route network address translation (NAT) session is created.

TCP Termination: Once the route for a packet is determined, a check is made to see if the flow is TCP terminated. If TCP termination is enabled and has not yet been processed for the packet, the packet is forwarded to the TCP termination queue and appropriate packets are injected into the IP forwarder at a later time.

Post-Route NAT: Post-route NAT is described further below. Second Route Lookup: Following the post-route NAT, it is possible that the destination address of the packet has been changed. When this occurs, a second route lookup is performed to find the correct output service.

Packet Filtering: Packets are filtered as they existed during route lookup. To accomplish this, the intermediate key stored on the connection, simply named "key", for example, is used for matching instead of the actual packet. Packet filtering is described in detail later in this document.

New Connections/Connection Restart: The new connections/connection restart includes processing for a connection abort, for new connections, for connection tracking, and for connection accounting, as described below.

Connection Abort: Existing connections may be destroyed in certain conditions. An aborted connection does not automatically drop a packet and may create a new connection. In order to make sure protocol tracking is in the proper state from the beginning of the connection, if a configuration change changes whether or not a connection is tracked, an existing connection is aborted. Also, due to the nature of NAT, if either end of the connection, source or destination IP address, is altered, it is not reasonable to expect either the originator or the responder to recognize the change and adjust their own sessions. Additionally, since the connection keys are also the information used for hashing and hash table matching, it is not safe to simply update the connection for the new NAT sessions. Given these concerns, any change in a NAT causes a connection to be aborted.

New Connections: If no connection exists for a packet, a new connection object is allocated and populated with the route, a NAT is done, and filter information that has already been determined is applied. The connection keys are then inserted into the connection hash table as appropriate with a reference to the connection. It may be possible that the connection keys are rejected by the connection hash table functionality because an identical key already exists. This generally occurs if a stale key exists in the table and if so, an error is generated. However, in order to protect the connection hash table when an identical key is found, the new connection is rejected, the packet is dropped, and an error is logged.

Connection Tracking: Protocol specific functions are called to update the packet based on the IP protocol of the packet. This tracking is described in detail below.

Connection Accounting: Connections maintain the following counters:

from_origin_packets: Counts successful packets from the connection originator.

from_origin_bytes: Counts successful bytes from the connection originator.

from_origin_packets_dropped: Counts dropped packets from the connection originator.

from_origin_bytes_dropped: Counts dropped bytes from the connection originator.

from_responder_packets: Counts successful packets from the connection responder.

from_responder_bytes: Counts successful bytes from the connection responder.

from_responder_packets_dropped: Counts dropped packets from the connection responder.

from_responder_bytes_dropped: Counts dropped bytes from the connection responder.

delta_from_origin_packets: Counts the number of packets matching this connection from the originator since the last time the flow counters were updated (used for logging).

delta_from_responder_packets: Counts the number of packets matching this connection from the responder since the last time the flow counters were updated (used for logging).

In order to allow the IP host code to be accessed from different code paths, notably packet fragments temporarily stored in the integrated firewall, the IP host process receives the packet fragments from a new code path that handles IP fragments in the integrated firewall code. The new code path examines the fragmented data to determine how the security policies should be applied. In this manner, an alternative code path into the IP host processing is provided to handle the IP fragments. A first code path, in the IP host process is used to identify conduit TRP traffic in normal conduit processing. Most IP host packets are actually conduit packets received from the WAN. The WAN egress conduit packets are decrypted and unencapsulated by software. IP Host processing includes support for an IPv4 packet which arrived at the APNA whose destination IP address matches one of the configured VIPs. This means that the APNA has to process the packet through the IPv4 stack as opposed to simply routing the packet.

A source route lookup is performed for traffic that is not processed as WAN Egress conduit, such as Internet control message protocol (ICMP) traffic, Internet protocol security (IPsec) or generic routing encapsulation (GRE) tunnels, or dynamic routing protocols, open shortest path first (OSPF) and border gateway protocol (BGP), for example, and for which processing has not yet determined the traffic source service. Traffic not processed as conduit traffic is passed to the integrated firewall via find_and_update_connection( ). If the integrated firewall does not consume the packet, the remainder of current ip_forward_process( ) is executed by a new function, do_ip_host_processing( ). Consuming a packet generally means that the integrated firewall code has dropped the packet because of a policy violation. Since the packet was "consumed" the caller of the integrated firewall code has no other work to do. A packet could also be consumed at step 1206 as the integrated firewall code can hang onto the packet while it waits for necessary fragmentation information to arrive.

The ip_forwarder_thread( ) dequeues packets from a send_to_ip_forwarder_queue and passes the the packets to the integrated firewall via find_and_update_connection( ). If the integrated firewall does not consume the packets, the remainder of current ip_forwarder_thread( ) is executed from a new function, do_ip_forwarding( ).

Step 308 of FIG. 3 shows integrated firewall policies including security zone evaluations are performed in IP forwarding. However, under certain conditions, destination route lookups may not be performed during IP forwarding. Rather, the route lookup may have been done earlier in the processing and step 308 can then use cached results of the route lookup. This doesn't change the processing stages shown in FIG. 3, but represents a performance improvement. Instead, the routes are determined and cached by the connection tracking in find_and_update_connection( ).

All packets not matching a more specific IP protocol are processed through generic protocol handlers. A generic protocol state machine tracks the following states according to Table 4 below.

INIT: New connections are initialized in this state. If the packet creating the connection is found to be invalid and is dropped, connections may remain for the initial timeout period.

NOT_TRACKED: Connections whose packet filter determines the connection is not to be tracked are immediately placed into this state. When in this state, no packet validation or other protocol tracking is performed.

NEW: The first valid packet from an originator transitions the connection to this state.

ESTABLISHED: The first valid packet from a responder transitions the connection to this state.

CLOSED: If a connection times out because no packets are received for a period of time, the connection is closed. A management process, further described below, reaps the connection by removing the connection structure from the connection hash table and putting the connection structure onto the free list.

DELETED: The final state for a connection after the management process has reaped the connection and placed it in the free list.

TABLE 4

Default Timeout Values by State

| State | Timeout (s) |
|---|---|
| INIT | 30 |
| NOT_TRACKED | 30 |
| NEW | 30 |
| ESTABLISHED | 300 |
| CLOSED | 0 |
| DELETED | 0 |

When the state machine is not in the NOT_TRACKED state, a connection tracking code validates all packets, not matching a more specific IP protocol, for the following properties including a correct IP checksum, an IP header length >=5 (20 bytes), an IP datagram length <=1500 (max supported by t2_app), an IP version==4 (and follow-on versions, such as IPv6, as needed and supported by the control program t2_app), and an IP TTL>0.

The ICMP protocol state machine tracks the following states according to Table 5 below.

INIT: New connections are initialized in this state. If the packet creating the connection is found to be invalid and is dropped, connections may remain for the initial timeout period.

NOT_TRACKED: Connections whose packet filter determines the connection is not to be tracked are immediately placed into this state. When in this state, no packet validation or other protocol tracking is performed.

NEW: The first valid packet from the originator transitions the connection to this state.

ESTABLISHED: The first valid packet from the responder transitions the connection to this state.

CLOSED: If a connection times out because no packets are received for a period of time, the connection is closed. A management process, described later in this document, reaps the connection by removing the connection structure from the connection hash table and putting the connection structure onto the free list.

DELETED: The final state for a connection after the management process has reaped the connection and placed it in the free list.

TABLE 5

Default Timeout Values by State

| State | Timeout (s) |
|---|---|
| INIT | 30 |
| NOT_TRACKED | 30 |
| NEW | 30 |
| ESTABLISHED | 60 |
| CLOSED | 0 |
| DELETED | 0 |

When not in the NOT_TRACKED state, a connection tracking code validates all packets for the following and disallows any packets that do not meet the listed properties including a correct IP checksum, an IP header length >=5 (20 bytes), an IP datagram length <=1500 (max supported by t2_app), an IP version==4 (and follow-on versions, such as IPv6, as needed and supported by the control program t2_app), an IP TTL>0, and if the packet is not fragmented: correct the ICMP checksum.

The TCP protocol state machine tracks the following states according to Table 8 below.

INIT: New connections are initialized in this state. If the packet creating the connection is found to be invalid and is dropped, connections may remain for the initial timeout period.

NOT_TRACKED: Connections whose packet filter determines the connection is not to be tracked are immediately placed into this state. When in this state, no packet validation or other protocol tracking is performed.

SYN_SENT: Initial SYN seen from the originator.

SYN_SENT2: SYN received from responder after the initial SYN from the originator (simultaneous open).

SYN_ACK_RCVD: SYN+ACK received from responder.

ESTABLISHED: ACK seen from originator. Handshake complete, connection fully established.

FIN_WAIT: FIN seen in one direction.

CLOSE_WAIT: FIN seen in both directions.

TIME_WAIT: Last ACK seen. From this state, either end may reopen the connection with a SYN.

CLOSED: If a connection times out because no valid packets are received for a period of time or a reset message is received, the connection is closed. A management process, described later in this document, reaps the connection by removing the connection structure from the connection hash table and putting the connection structure onto the free list.

DELETED: The final state for a connection after the management process has reaped the connection and placed it in the free list.

INVALID: This state is not valid for the state machine to be in. It is used in the state transition table to identify packets that are not valid for the current TCP state and should be dropped.

IGNORE: This state is not valid for the state machine to be in. It is used in the state transition table to identify unexpected packets that might change the state but are temporarily ignored as they might not be part of the current data stream.

TCP state transitions are based on the current state and the TCP flags in the received packet as illustrated in Tables 6 and 7 below. The state machine generally follows RFC 793, Sec. 3.2, FIG. 6, however, some states are less strict since the integrated firewall is also an observer of the connection. Specifically, the integrated firewall state machine allows for observing TCP sessions that are already in progress and handling unexpected session restarts.

TABLE 6

Originator TCP State Transition

| Current State | TCP Flags | Next State |
|---|---|---|
| INIT | No flags set | INVALID |
| | SYN | SYN_SENT |
| | SYN + ACK | INVALID |
| | FIN | INVALID |
| | ACK | ESTABLISHED |
| | RST | INVALID |
| NOT_TRACKED | No flags set | NOT_TRACKED |
| | SYN | NOT_TRACKED |
| | SYN + ACK | NOT_TRACKED |
| | FIN | NOT_TRACKED |
| | ACK | NOT_TRACKED |
| | RST | NOT_TRACKED |
| SYN_SENT | No flags set | INVALID |
| | SYN | SYN_SENT2 |
| | SYN + ACK | INVALID |
| | FIN | INVALID |
| | ACK | INVALID |
| | RST | CLOSED |

TABLE 6-continued

Originator TCP State Transition

| Current State | TCP Flags | Next State |
| --- | --- | --- |
| SYN_SENT2 | No flags set | INVALID |
|  | SYN | SYN_SENT2 |
|  | SYN + ACK | SYN_ACK_RCVD |
|  | FIN | INVALID |
|  | ACK | INVALID |
|  | RST | CLOSED |
| SYN_ACK_RCVD | No flags set | INVALID |
|  | SYN | IGNORE |
|  | SYN + ACK | INVALID |
|  | FIN | FIN_WAIT |
|  | ACK | ESTABLISHED |
|  | RST | CLOSED |
| ESTABLISHED | No flags set | INVALID |
|  | SYN | IGNORE |
|  | SYN + ACK | INVALID |
|  | FIN | FIN_WAIT |
|  | ACK | ESTABLISHED |
|  | RST | CLOSED |
| FIN_WAIT | No flags set | INVALID |
|  | SYN | IGNORE |
|  | SYN + ACK | INVALID |
|  | FIN | LAST_ACK |
|  | ACK | CLOSE_WAIT |
|  | RST | CLOSED |
| CLOSE_WAIT | No flags set | INVALID |
|  | SYN | IGNORE |
|  | SYN + ACK | INVALID |
|  | FIN | LAST_ACK |
|  | ACK | CLOSE_WAIT |
|  | RST | CLOSED |
| LAST_ACK | No flags set | INVALID |
|  | SYN | IGNORE |
|  | SYN + ACK | INVALID |
|  | FIN | LAST_ACK |
|  | ACK | TIME_WAIT |
|  | RST | CLOSED |
| TIME_WAIT | No flags set | INVALID |
|  | SYN | SYN_SENT |
|  | SYN + ACK | INVALID |
|  | FIN | TIME_WAIT |
|  | ACK | TIME_WAIT |
|  | RST | CLOSED |
| ALL OTHER STATES | — | INVALID |

TABLE 7

Responder TCP State Transition

| Current State | TCP Flags | Next State |
| --- | --- | --- |
| INIT | No flags set | INVALID |
|  | SYN | INVALID |
|  | SYN + ACK | INVALID |
|  | FIN | INVALID |
|  | ACK | INVALID |
|  | RST | INVALID |
| NOT_TRACKED | No flags set | NOT_TRACKED |
|  | SYN | NOT_TRACKED |
|  | SYN + ACK | NOT_TRACKED |
|  | FIN | NOT_TRACKED |
|  | ACK | NOT_TRACKED |
|  | RST | NOT_TRACKED |
| SYN_SENT | No flags set | INVALID |
|  | SYN | SYN_SENT2 |
|  | SYN + ACK | SYN_ACK_RCVD |
|  | FIN | INVALID |
|  | ACK | IGNORE |
|  | RST | CLOSED |
| SYN_SENT2 | No flags set | INVALID |
|  | SYN | SYN_SENT2 |
|  | SYN + ACK | SYN_ACK_RCVD |
|  | FIN | INVALID |
|  | ACK | IGNORE |
|  | RST | CLOSED |
| SYN_ACK_RCVD | No flags set | INVALID |
|  | SYN | INVALID |
|  | SYN + ACK | IGNORE |
|  | FIN | FIN_WAIT |
|  | ACK | SYN_ACK_RCVD |
|  | RST | CLOSED |
| ESTABLISHED | No flags set | INVALID |
|  | SYN | INVALID |
|  | SYN + ACK | IGNORE |
|  | FIN | FIN_WAIT |
|  | ACK | ESTABLISHED |
|  | RST | CLOSED |
| FIN_WAIT | No flags set | INVALID |
|  | SYN | INVALID |
|  | SYN + ACK | IGNORE |
|  | FIN | LAST_ACK |
|  | ACK | CLOSE_WAIT |
|  | RST | CLOSED |
| CLOSE_WAIT | No flags set | INVALID |
|  | SYN | INVALID |
|  | SYN + ACK | IGNORE |
|  | FIN | LAST_ACK |
|  | ACK | CLOSE_WAIT |
|  | RST | CLOSED |
| LAST_ACK | No flags set | INVALID |
|  | SYN | INVALID |
|  | SYN + ACK | IGNORE |
|  | FIN | LAST_ACK |
|  | ACK | TIME_WAIT |
|  | RST | CLOSED |
| TIME_WAIT | No flags set | INVALID |
|  | SYN | INVALID |
|  | SYN + ACK | IGNORE |
|  | FIN | TIME_WAIT |
|  | ACK | TIME_WAIT |
|  | RST | CLOSED |
| ALL OTHER STATES | — | INVALID |

Packets which cause a state transition to INVALID are immediately dropped. Packets which cause a state transition to IGNORE are considered valid, but do not immediately change the connection state or update tracking data. These packets indicate a possible TCP session restart which may in fact be valid. The TCP window and direction of the packet are temporarily stored. If the next packet observed from the opposite direction is a valid response to the previously ignored packet, the connection state and tracking are updated to correspond to the session restart, which means the connection stat is set to (SYN_ACK_RCVD).

When not in the NOT_TRACKED state, a connection tracking code validates all packets for the following and disallows any packets that do not meet the listed properties including a correct IP checksum, an IP header length >=5 (20 bytes), an IP datagram length <=1500 (max supported by t2_app), an IP version==4 (and follow-on versions, such as IPv6, as needed and supported by the control program t2_app), an IP TTL>0, if the packet is not fragmented: correct the TCP checksum, and if the packet is not fragmented or a first fragment: check for valid TCP Flag combinations: SYN, SYN+ACK, SYN+URG, RST, RST+ACK, FIN+ACK, FIN+ACK+URG, ACK, ACK+URG and check for sequence and acknowledgment numbers in window (requires TCP window tracking, including parsing selective acknowledgment and window scaling option headers).

TABLE 8

| Default Timeout Values by State | |
| --- | --- |
| State | Timeout (s) |
| INIT | 30 |
| NOT_TRACKED | 30 |
| SYN_SENT | 120 |
| SYN_SENT2 | 120 |
| SYN_ACK_RCVD | 60 |
| ESTABLISHED | 7440 |
| FIN_WAIT | 120 |
| CLOSE_WAIT | 60 |
| LAST_ACK | 30 |
| TIME_WAIT | 120 |
| CLOSED | 0 |
| DELETE | 0 |

The user datagram protocol (UDP) protocol state machine tracks the following states according to Table 9 below.

INIT: New connections are initialized in this state. If the packet creating the connection is found to be invalid and is dropped, connections may remain for the initial timeout period.

NOT_TRACKED: Connections whose packet filter determines the connection is not to be tracked are immediately placed into this state. When in this state, no packet validation or other protocol tracking is performed.

NEW: The first valid packet from the originator transitions the connection to this state.

ESTABLISHED: The first valid packet from the responder transitions the connection to this state.

CLOSED: If a connection times out because no packets are received for a period of time, the connection is closed. A management process, described later in this document, reaps the connection by removing the connection structure from the connection hash table and putting the connection structure onto the free list.

DELETED: The final state for a connection after the management process has reaped the connection and placed it in the free list.

TABLE 9

| Default Timeout Values by State | |
| --- | --- |
| State | Timeout (s) |
| INIT | 30 |
| NOT_TRACKED | 30 |
| NEW | 30 |
| ESTABLISHED | 300 |
| CLOSED | 0 |
| DELETED | 0 |

When not in the NOT_TRACKED state, a connection tracking code validates all packets for the following and disallows any packets that do not meet the listed properties including a correct IP checksum, an IP header length >=5 (20 bytes), an IP datagram length <=1500 (max supported by t2_app), an IP version==4 (and follow-on versions, such as IPv6, as needed and supported by the control program t2_app), an IP TTL>0, and if packet is not fragmented: correct the UDP checksum.

When a filter policy denies a packet flow, a flag appropriate to the direction of traffic is set (from_origin_denied or from_responder_denied). When one or both of these flags is set, the state of the connection is reported as one of the following:

O_DENIED: Packets from the originator are denied,
R_DENIED: Packets from the responder are denied,
DENIED: Packets from both directions are denied.

In these states, all listed connections use the global untracked/denied timeout, 30 seconds by default.

NAT stores its data in two main data structures, nat_rule_t and nat_masquerade_t. The nat_rule_t defines all NAT objects in t2_app, whether static or dynamic. The rule object identifies the NAT match criteria and settings, stores stateful tables for port restricted NAT rules, stores counters for packets matching the rule, and maintains a doubly linked list of connections using the rule. When a "port restricted NAT" is processed, selected state is maintained as the IP and port mapping on a connection depends on decisions made for prior connections. The "port restricted NAT" does endpoint-independent mapping as defined in standard RFC4787. The nat_masquerade_t stores the stateful information for port restricted dynamic NAT rules. This information is used to maintain endpoint independent NAT associations between inside and outside hosts for ICMP, TCP and UDP connections. It is not necessary to maintain additional information for symmetric NAT rules because the connection hash table contains all necessary information to maintain unique endpoint dependent NAT associations.

NAT rules are maintained using several global objects:

nat_rules_array: The NAT rules array is an array of NAT rule objects allocated at t2_app initialization. The array provides a basis for index values allowing the connection object to store a smaller reference to associated NAT rules (2-byte index instead of an 8-byte pointer).

nat_rules: NAT rules is an ordered, doubly linked list (t2_dlist), of currently configured NAT rules. This list is used for NAT rule matching of packets and is sorted by the order given by the compiler.

nat_rules_version: The NAT rules version is a 16-bit counter representing the current version of the nat_rules list. The version is incremented each time a change is made to the list. Each connection stores a version for its associated NAT rules. When a version change is detected, the connection handling code at step 1274 of FIG. 12B performs a new NAT lookup. If a new translation is found, the connection is aborted and recreated with the new translation.

nat_free_rules: NAT free rules is a doubly linked list of NAT rules. At t2_app initialization, all NAT rules are added to the NAT free rules list.

nat_masq_array: That NAT masq array is any array of NAT masquerade objects allocated at t2_app initialization. NAT masquerade objects are allocated and referenced on NAT objects for port restricted NAT rules. A single masquerade object is allocated for each outside IP address and may be shared between NAT rules.

nat_free_masq: NAT free masq is a double linked list of NAT masquerade objects. At t2_app initialization, all NAT masquerade objects are added to the NAT free masq list.

ilb_masquerade: Internet load balance (ILB) is an APN technique to spread Internet traffic over multiple WAN links. The ILB masquerade is a two-dimensional array of NAT masquerade objects, indexed by a routing domain ID and WAN link index. The ILB masquerade array maintains port restricted masquerade information specifically for load balanced Internet services. When a port restricted NAT rule is configured for a load balanced Internet service, the masquerade object for the rule is assigned using the routing domain ID and WAN link index for each access interface used in the Internet service.

Traffic filtering is the ability to match information contained in a packet and information the system knows about the packet to allow or deny that packet's transmission. The most basic level of filtering uses a canonical 5-tuple as the filter criteria defined as (source IP, destination IP, IP protocol, source port and destination port). More complex filters include additional packet fields such as terms of service (TOS)/differentiated services code port (DSCP) as well as contextual information like the interface/virtual LAN (VLAN) a packet was received on or is destined to.

By dividing networks into logical areas, named security zones described in more detail below, filter rules can be simplified and also provide improved network protection. Firewall security zones on some APNAs also support the creation of implicit trust relationships. There is an implicit trust relationship that everything within the same zone can freely communicate with each other. This means that administrators only need to define policies for traffic that crosses zones. This approach is more advantageous than trying to define explicit policies on an IP address basis. For example, traffic from a "lower" trust security zone may not flow to a "higher" trust security zone without a NAT being present to translate the traffic.

With regard to FIG. 11 described below, in the forwarding stage, such as step 308 in FIG. 3 and step 420 in FIG. 4, traffic filters are applied at step 1110 to packets after pre-route NAT is applied at step 1106 and after a destination route lookup at step 1108 is performed. Filters at this stage are only applied to packets that are forwarded beyond the appliance. In the output stage, traffic filters are applied to packets from the host after post-route NAT is performed and just before packets are written to their output interface. Advantageously, integrated security utilizing firewall traffic filtering according to firewall policies that include security zone evaluations of the present invention is performed in IP forwarding, such as step 308 in FIG. 3 and step 420 in FIG. 4. The APNA supports filtering in the forwarding stage using both packet and contextual information. The IP forwarding allows filtering of traffic coming from any service and going to any service and also filters traffic between LAN segments. The filtering functions that were generally done on the input and output stages are accomplished by allowing filtering on IP host routes. For example, APNAs support filtering on any or all of the following identification parameters in table 10, such as filtering on a source security zone and filtering on a destination security zone. The filter match criteria also supports a wild card match on any of the parameters included in the criteria. For example, consider match criteria 5, source IP address of Table 10 below. If this criteria is set to a wild card, then when the filter is matched to a packet, any source IP address that the packet can have is going to be considered as successfully matching this criteria. A packet matches a filter if it successfully matches all criteria. Also in table 10, where for each source/destination listing there are different match criteria for a source and for a destination. For example, in criteria 5, source/destination IP address, there is a source IP address criteria and a destination IP address criteria. This notation also applies to criteria 4 and 6.

TABLE 10

| # | Filter Match Criterion |
|---|---|
| 1 | Routing domain: The virtual routing and forwarding (VRF) instance for the traffic |
| 2 | IP protocol: transmission control protocol (TCP), user datagram protocol (UDP), Internet control message protocol (ICMP), generic routing encapsulation (GRE), and the like |

TABLE 10-continued

| # | Filter Match Criterion |
|---|---|
| 3 | Differentiated Services Code Port (DSCP) tag |
| 4 | Source/Destination security zone identification |
| 5 | Source/Destination IP address |
| 6 | Source/Destination port (when IP protocol is TCP or UDP) |
| 7 | ICMP type and code (when IP protocol is ICMP) |
| 8 | Source service: the APN service (virtual interface, conduit, intranet, Internet, LAN GRE tunnel, LAN Internet protocol security (IPsec) tunnel and IP Host) that the traffic was received on. |
| 9 | Destination service: the APN service (virtual interface, conduit, intranet, Internet, LAN GRE tunnel, LAN IPsec tunnel and IP Host) that the traffic is to be sent on. |

Security zones are defined globally and applied by the APNAs locally in an APN. Security zones are assigned to services that receive and send traffic into and out of the APN, through use of virtual interfaces, intranet services, Internet services, LAN GRE tunnels, LAN IPsec tunnels, and the like. Security zones within the APN maintain their global significance for the purposes of filtering. Packets received from a conduit maintain the security zone the packet was received on prior to being sent on the conduit. Additionally, packets routed to a conduit know the security zone the packets will leave the APN on prior to being sent into the conduit. A conduit only exists in an APN, but the packets that the conduit transports come from outside the APN and also get delivered to something outside the APN. When a packet is entering the APN and headed for a conduit, the security zone that originated the packet is known and the security zone where the packet will exit the APN is also known. In this way, the entire APN is the border of the firewall instead of a single appliance acting independently.

Figure 7:
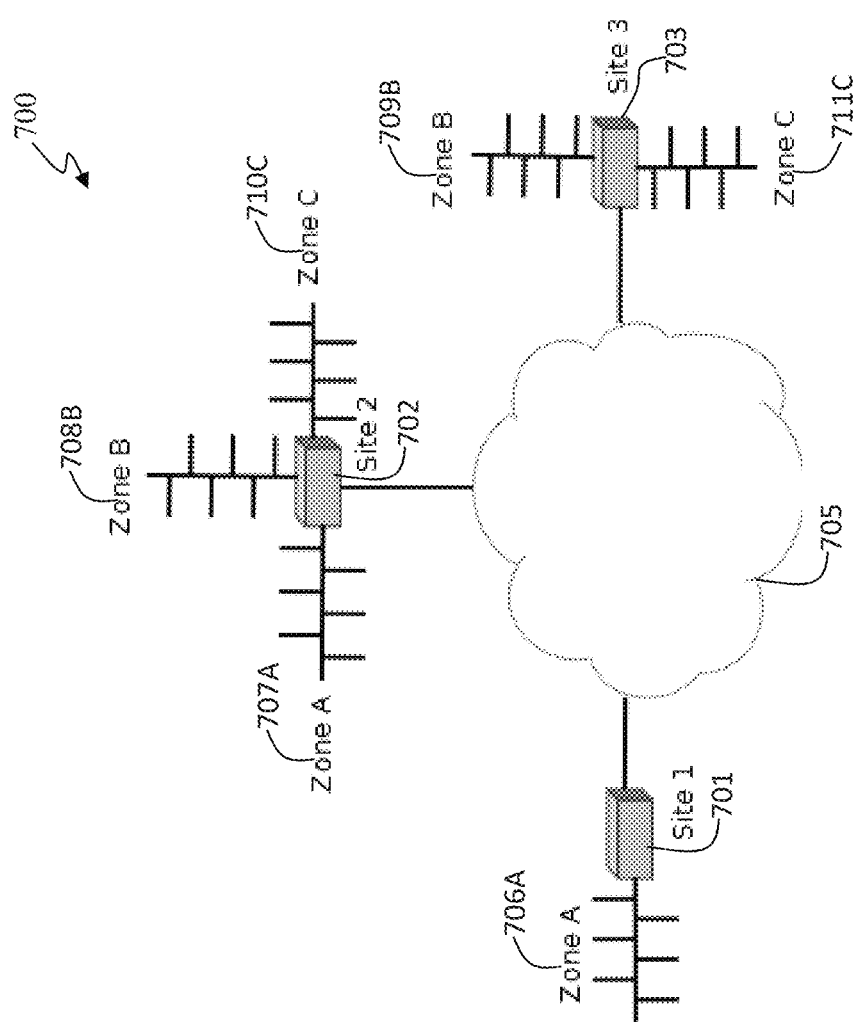
FIG. 7 illustrates an exemplary integrated firewall security zone configuration in accordance with an embodiment of the present invention.

FIG. 7 illustrates an exemplary integrated firewall security zone configuration 700 in accordance with an embodiment of the present invention. The filter rules in Table 11 are applied to the exemplary integrated firewall security zone configuration 700:

TABLE 11

| Rule | Zone | → | Zone | Action |
|---|---|---|---|---|
| 1 | A | → | A | Allow |
| 2 | A | → | B | Deny |
| 3 | A | → | C | Allow |
| 4 | B | → | A | Deny |
| 5 | B | → | B | Allow |
| 6 | B | → | C | Deny |
| 7 | C | → | A | Allow |
| 8 | C | → | B | Deny |
| 9 | C | → | C | Allow |

According to rules 1 and 3 of the integrated firewall, sites in security zone A can transmit data to other sites in the same security zone A and to sites in security zone C. According to rule 2 of the integrated firewall, sites in security zone A are prevented from transmitting data to sites in security zone B. According to rules 4 and 6 of the integrated firewall, sites in security zone B are prevented from transmitting data to sites in security zone A and security zone C. Sites in security zone B can transmit data to other sites in the same security zone B according to rule 5. According to rules 7 and 9 of the integrated firewall, sites in security zone C can transmit data to other sites in the same security zone C and to sites in security zone A. According to rule 8 of the integrated firewall, sites in security zone C are prevented from transmitting data to sites in security zone B.

In contrast with prior firewalls in which their rules only have local significance at a site, the integrated firewall, for routes the APN automatically creates, site 1 701 knows that the final destination of received packets, the destination traffic, is identified to be security zone B, regardless of a security zone B destination being at site 2 702 and at site 3 703, and consequently, due to the integrated firewall filtering rule of Table 11, site 1 701 blocks the security zone B destination traffic at site 1 701 preventing the traffic from entering the network 705.

Also, in contrast with prior firewalls in which their rules only have local significance at a site, the integrated firewall, as described herein, prevents transmitting traffic from site 3 703, security zone C 711C to site 2 702, security zone B 708B, but allows transmitting traffic from site 3 703, security zone C 711C to site 2 702, security zone C 710C and from site 3 703, security zone B 709B to site 2 702, security zone B 708B.

For example, security zone B may represent a payroll system installed at site 2 702 with user access points in security zone B 708B and at site 3 703 with user access points in security zone B 709B. Zone A may represent a marketing and sales system installed at site 1 701 with user access points in security zone A 706A and at site 2 702 with user access points in security zone A 707A. Zone C may represent an engineering system installed at site 2 702 with user access points in security zone C 710C and at site 3 703 with user access points in security zone C 711C. In this scenario, with the rules of Table 11 of the integrated firewall, the payroll system of security zone B is isolated from users of the marketing and sales system of security zone A and from users of the engineering system of security zone C while still allowing security zone B communications between sites 2 and 3. The payroll system of security zone B at site 2 is also isolated from users of the marketing and sales system of security zone A at site 2 and of the engineering system of security zone C at the same site 2.

Such operation is accomplished in two ways. First, a packet's transport reliable protocol (TRP) flow header is modified to include a source security zone that the traffic was received on to allow filtering at the remote end of a conduit. The TRP flow header is part of a conduit's encapsulation and contains information related to that flow. Packets that are received are assigned a source security zone. This assignment is based on the virtual network interface (VNI), Internet protocol security (IPsec), generic routing encapsulation (GRE) tunnel, and the like that received the packet. The user assigns security zones to these objects. The ID for the source security zone is placed in the flow header and carried across the conduit. Second, the route table is modified to include the final destination security zone which is included in the flow header for traffic using the route to allow filtering of remote security zones locally at sites. Since the route entry contains the security zone at the final destination site, the site ingressing traffic into the conduit can look to see if receiving the traffic at the final destination site would violate a security zone specified by the security policy. This inclusion of the final destination security zone in the packet header allows the integrated firewall to filter out a packet when the packet is received from the LAN rather than wasting bandwidth by sending the packet across the WAN only to have the far end drop the packet because external firewall filters did not allow it. This inclusion of both source and destination security zones in a packet header is applicable to routes determined from dynamic route learning methods using simple network management protocol (SNMP) route learning, border gateway protocol (BGP), open shortest path first (OSPF), and the like, and dynamic route updates for route eligibility and dynamic conduits.

It is noted that to filter security zones globally, for conduit routes, the APNA has the ability to configure static conduit routes to allow forwarding of arbitrary traffic to a remote site. These static routes, such as those routes that a user creates, cannot be identified with the security zone that the traffic will egress on due to the route being created by a user, so traffic hitting that statically configured route does not perform a check against the destination security zone. Accordingly, while filtering is still done, it may not be as efficient for such conduit routes a user arbitrarily adds. For example, for such a user added route, the information added to a packet would still include identification of the source zone. After consuming WAN bandwidth, the egress side of the conduit examines the packet and determines what the destination zone is and then using the embedded source zone is able to do a full check of the security policies. In that case, traffic traverses the network and then possibly gets dropped on the far end of the conduit based on the examined security policies. However, in most cases, users do not need to add a route that says "send traffic to subnet X over the conduit to site 2", for example, as the APN configuration compiler can do this automatically. So, when site 2 has a subnet X defined, then the existence of a conduit between site 1 and site 2 means that site 1 automatically has a route that says site 2 can be used to get to subnet X and that route then has the destination security zone information attached to it, and thus the security zone is properly filtered preventing consumption of WAN bandwidth at the source site if specified by the security policies.

On inbound NAT, described further below, the source address for packets is changed as they enter the APN. Because of this address translation, the true security zone the traffic was received on can only be filtered on the appliance where the traffic was translated. For remote sites, the security zone that is reported in the TRP flow header is the security zone for the source IP address the traffic was translated to. Because NAT is changing addresses, the far end remote site, in this case, does not know the original source IP address. When the traffic entered the APN at the near end site, the system performed a pre-route NAT, also referred to as a source NAT, and then did a route lookup which set a security zone based on the translated source IP address. For the inbound route case, the filtering is still being done globally because the security zone that received the packet is being carried across the network with the packet. The packet still uses WAN bandwidth, but the far end of the conduit is able to make a decision on the packet with security information that it would not normally have without use of the APN security zone filtering. An important aspect of the APN security zone filtering according to the present invention is that security zones span across the APN and the security policies can take advantage of the security information to reduce network traffic and improve on filtering according to security zone partitioning. This method also reduces administrative errors since the security policies for the entire network are defined in one location. The security policies can also be much simpler since source zone information is carried across the conduit so remote sites can enforce security policies based on how the packet entered the APN. Without the source zone information, the WAN egress side of the conduit would only know that a packet came from the conduit, but it would not know which security zone had put the packet into the conduit. Without the embedded source security zone, an administrator would have to create complex security policies based around all the possible IP addresses that might exist within a security zone. This leads to errors, especially as networks evolve and new subnets are added to a security zone.

Without the APN security zone filtering, security zones on a site would only have meaning within that site. This localization makes it difficult for an administrator to define global security policies at all sites because the administrator must decompose this local specification into individual policies at each site. In cases where NAT is involved and without the integrated firewall, it could be impossible to define security zone policies correctly because information about the original packet is most likely lost in translation.

Network address translation (NAT) allows a device to remap network IP addresses in packets that pass through the device. The most common use allows devices using private addresses described in request for comment (RFC) 1918 to access the public Internet. NAT devices manipulate the source and/or destination addresses in a header of Internet protocol version 4 (IPv4) packets and stores their manipulations so that the NAT devices can undo those changes for packets in the reverse direction of a flow. In some configurations, NAT also makes changes to TCP and UDP port numbers, which is also known as network address port translation (NAPT) in RFC 2663 section-4.1.2.

As described above, many firewalls have multiple stages allowing for at least two points for NAT to be performed. At a first point, which is a pre-route NAT, rules are applied to traffic prior to a route table lookup and directly affect the route lookup. At the second point, which is a post-route NAT, rules are applied after a route table lookup. To simplify NAT configuration and understanding, many firewalls use a concept of inside and outside to imply directionality of the NAT. An inside network is typically a private network while an outside network is typically a public/WAN network. In order to allow a high degree of flexibility and accommodate the most use cases, NAT rules can be configured with a direction, inbound or outbound, to determine which side of the NAT is inside. An inbound NAT rule performs a source translation on packets received from a service and a destination translation on packets sent to a service. An outbound NAT rule performs a source translation on packets sent to a service and a destination translation on packets received from a service. The integrated firewall performs a source NAT (SNAT) or destination NAT (DNAT) depending on the use case. Additionally, it is possible to translate a packet twice, if the packet ingresses and egresses through NAT-eligible services.

In a first scenario, a customer backhauls their Internet service into their data center. For example, branch offices access Internet sites by going through an intranet, multiprotocol label switching (MPLS) or virtual private network (VPN) tunnel, to the data center, which then has Internet connectivity and possibly some smart firewalling device. It is common to need to NAT traffic to and from the Internet in this first scenario. In a second scenario, a user may need to use NAT to allow an Intranet site to access other Intranet sites. This occurs many times when a larger company has acquired multiple smaller companies and the merged company ends up with duplicate subnet address ranges within their network. Now in a combination of these two scenarios, a remote intranet site needs NAT and that site also backhauls their Internet traffic to the data center. The APNA at a datacenter would need to do two NATs to connect that intranet site to the Internet. Traffic to the Internet would have pre-route inbound NAT done on traffic from the intranet service and post-route outbound NAT done on traffic headed to the Internet. Note that the user configures the rules to be used in the pre-route and post-route NAT processing so the user has control of how the traffic flows. It is noted that there is no requirement that a datacenter be an NCN. There is also no requirement that an NCN be in a datacenter. Many enterprises configure their networks so that there is one Internet point in their whole network. In this setup, the datacenter has a high bandwidth Internet connection. The various branch offices have some connections to the data center over some private network, such as MPLS and/or VPN. When branch offices want to access the Internet, traffic flows over the private network to the datacenter and then the datacenter sends that to the Internet. So, it may be that the datacenter must NAT all traffic to the Internet. It may also be that the traffic over the private network has to have NAT applied as it enters the datacenter. This means that branch office traffic headed to the Internet must have NAT applied twice.

A common use case for an inbound NAT is to hide an entirely local network that need not be routable or known to the rest of the network. In the APN, this could be a configuration of overlapping private networks at disparate locations which configuration is generally disallowed because it creates split routing scenarios. Split routing scenarios refers to remote sites with overlapping subnets which can mean that it is unclear where traffic should go. If there are two sites that both hold the address 192.168.1.1, it is not obvious who should get traffic destined to that address? Different sites could end up routing to that address in different ways. By marking a virtual IP (VIP) address as "private", which makes it routable only to the local appliance, and using an inbound NAT, it is possible to support overlapping local subnets.

In a standard network configuration using external firewall devices prior to connecting to a WAN, both external firewall devices could NAT the internal IP subnets to overlapping IP address ranges. Using the integrated firewall as described herein, an inbound NAT is used to make those internal IP subnets appear to be non-overlapping subnets to other sites. An outbound NAT is the form of NAT most people are familiar with. Home routers, also known as gateway routers, hide a home network behind a single public IP address just as the traffic is leaving their network. This usage is, generally considered, the most common use case for outbound NAT.

Figure 8:
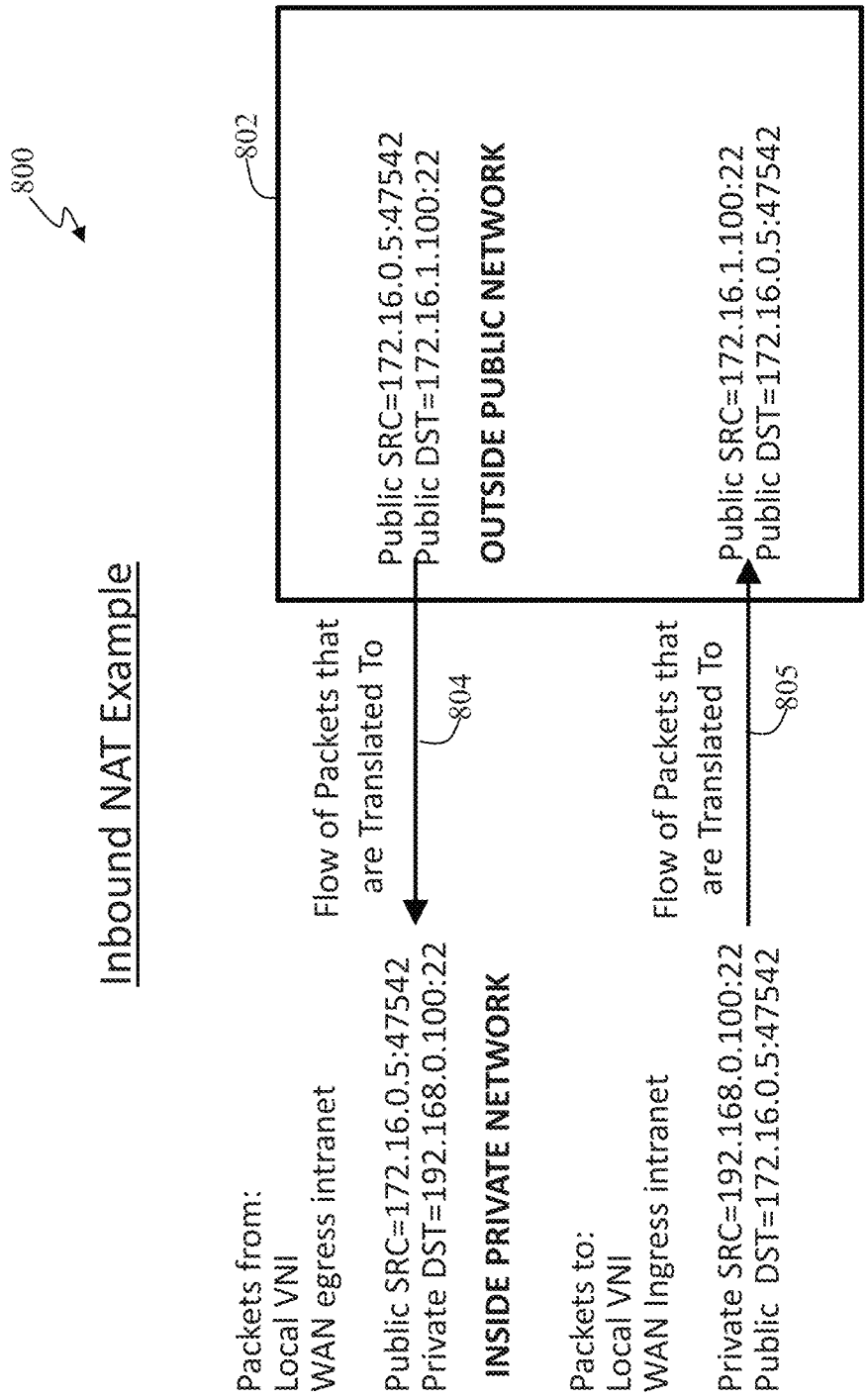
FIG. 8 illustrates an example of an inbound network address translation (NAT) operation in accordance with an embodiment of the present invention.

FIG. 8 illustrates an example of an inbound NAT operation 800 in accordance with an embodiment of the present invention. Inbound is a term representing direction of traffic in a NAT operation. In FIG. 8, the box 802 is the APNA and the arrows 804 and 805 are the flow of packets. In a first direction 805 the source IP address is translated and in a second direction 804 the destination IP address is translated. So whether a source NAT or a destination NAT is done depends on the direction the traffic is taking. The inbound NAT occurs in the integrated firewall IP forwarding step 308 of FIG. 3 and in the integrated firewall IP forwarding step 420 of FIG. 4. Inbound NAT allows outside public networks to initiate connections to an inside private network, such as the APN. For the inbound NAT example 800 of FIG. 8, the inside private network is in the 192.168.0.0/24 space and NAT maps addresses there to an outside public 172.16.1.0/24 space. This example shows a host at 172.16.0.5 making an SSH connection to 172.16.1.100 and that connection gets a source translation to a connection to the private address 192.168.0.100. So, when a customer selects a static NAT type of inbound, they specify what part of the network is the inside and what part of the network is the outside by associating a service to the NAT rule. For example, a static NAT policy can be set with a type of Inbound where service is equal to a specified LAN interface. That would mean that the inside network in FIG. 8 is the LAN interfaces and the outside network is wherever the packet is destined for. The customer has the flexibility to set the services any way they want, though, so they could set service is equal to intranet and then the inside network would map to the intranet and the outside network would map to wherever the packet is destined for. Regardless of how the user configures the services, the network address is translated as shown in FIG. 8.

Figure 9:
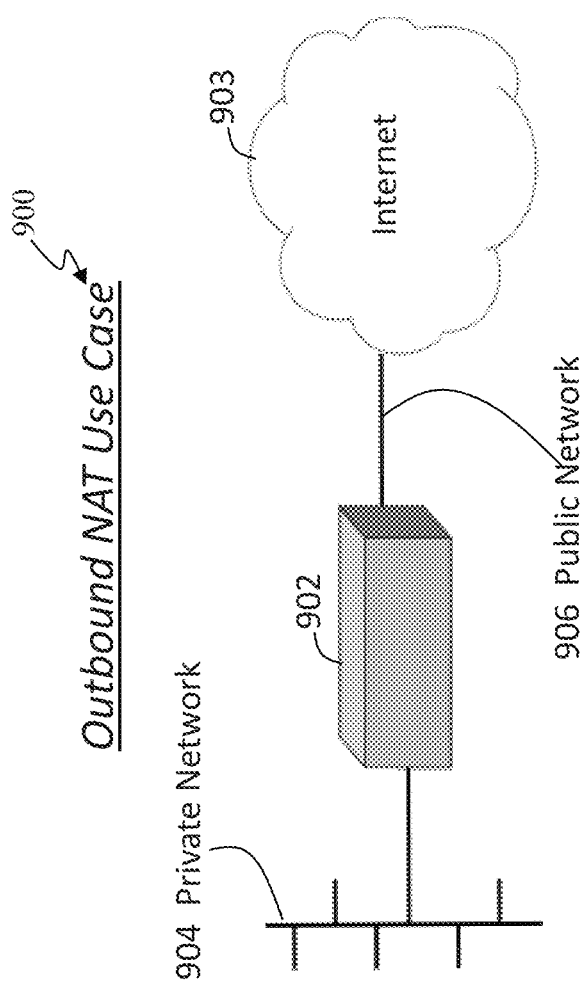
FIG. 9 illustrates an example of an outbound NAT use case in accordance with an embodiment of the present invention.

FIG. 9 illustrates an example of an outbound NAT use case 900 in accordance with an embodiment of the present invention. FIG. 9 shows a standard use case for dynamic outbound NAT. Most people's home Internet connection is just like this. Block 902 represents an APNA with an integrated firewall. Network 904 is a private network hidden behind a dynamic NAT on Internet service. Network 906 is a public network on an untrusted interface and having a DHCP IP address. An outbound dynamic NAT is used on the Internet service using a public IP address for the outside IP.

Figure 10:
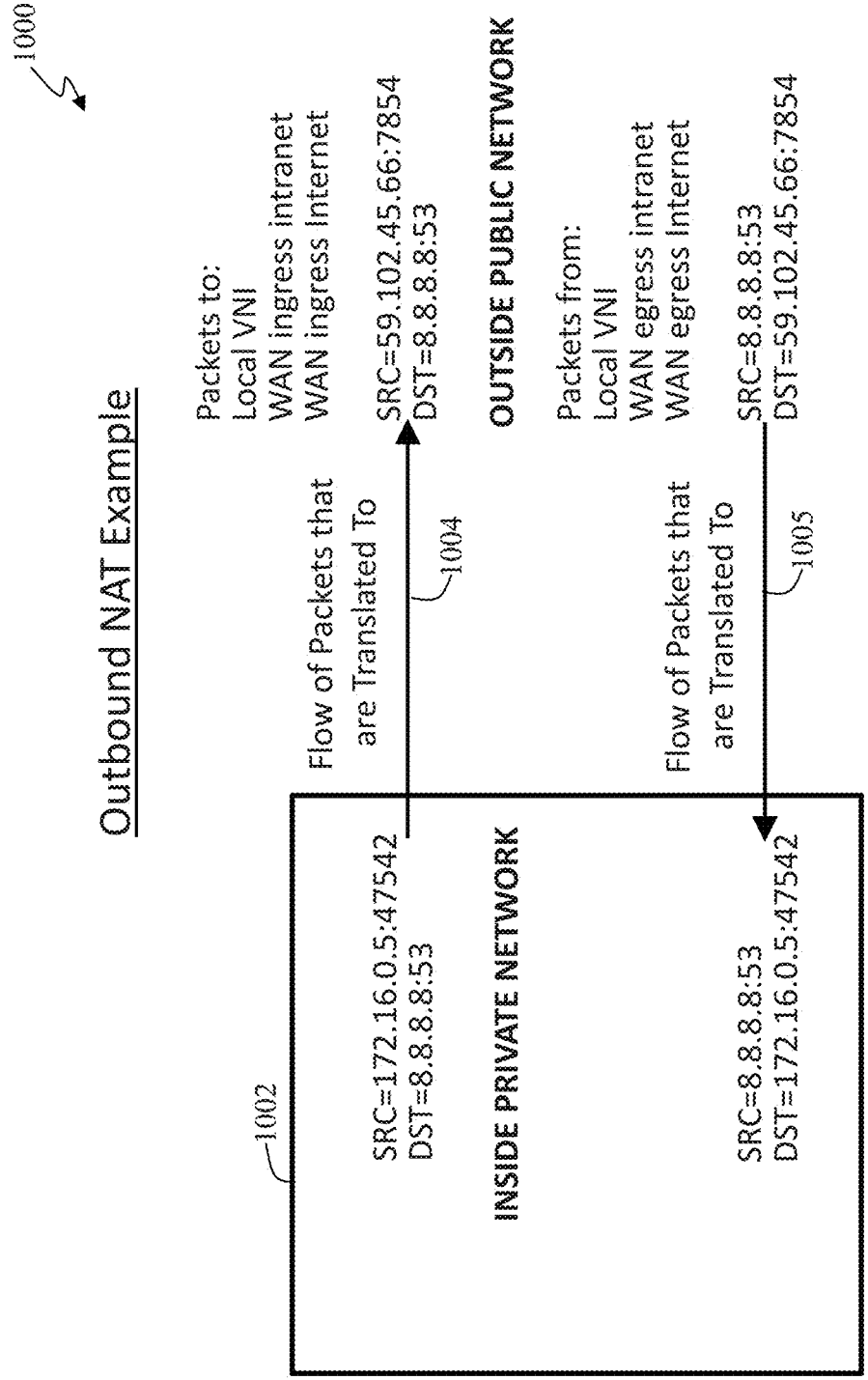
FIG. 10 illustrates an example of an outbound NAT operation in accordance with an embodiment of the present invention.

FIG. 10 illustrates an example of an outbound NAT operation 1000 in accordance with an embodiment of the present invention. FIG. 10 shows how packets are modified by the outbound NAT process in the integrated firewall to support the use case of FIG. 9. In FIG. 10, the box 1002 is the APNA with integrated firewall and the arrows 1004 and 1005 are the flow of packets with NATs as indicated. The outbound NAT occurs in the IP forwarding step 308 of FIG. 3 and in the IP forwarding step 420 of FIG. 4. Typically, an outbound NAT allows a private internal network to initiate connections to external networks, such as the Internet and other public networks. Outbound NAT allows inside private networks, such as the APN, to initiate connections to an outside public network. For the outbound NAT example 1000 of FIG. 10, the outside public network IP address is 59.102.45.66 and NAT maps addresses there from an inside private 172.16.0.0/24 space. So, when a customer selects a dynamic NAT type of outbound, they specify what part of the network is the inside and what part of the network is the outside by associating a service to the NAT rule. For example, a dynamic NAT policy can be set with a type of outbound where service is equal to a specified Internet service. That would mean that the outside network in FIG. 10 is the Internet service and the inside network is for the LAN interface. The customer has the flexibility to set the services any way they want, though, so they could set service is equal to LAN and then the outside network would map to the LAN and the inside network would map to the Internet. Regardless of how the user configures the services, the network address is translated as shown in FIG. 10. A packet originating from the host on the internal LAN with IP address of 172.16.0.5 to the Internet IP address of 8.8.8.8 may be sent with a source port of 47542 and a destination port of 53. When the APNA receives this traffic, it translates the internal source IP address from 172.16.0.5 to the external public IP address of 59.102.45.66 and changes the source port from 47542 to 7854. The destination IP address and port are left unchanged in the packet. When the Internet host at 8.8.8.8 responds, it sends a packet with a source IP of 8.8.8.8 and a source port of 53 to the IP destination of 59.102.45.66 with a destination port of 7854. The APNA recognizes that the destination of 59.102.45.66:7854 maps to the internal host 172.16.0.5:47542 so it changes the destination IP address and port of the packet and forwards the packet to the host on the internal network.

In terms of FIG. 1A, a NAT could be occurring on traffic between sites or from a site to an Internet server or from a site to a non APN site or from a non APN site to the Internet server. The user can configure the NAT rules however they want. The term "intranet" means a site such as the non APN site 120 of FIG. 1A. Such a site is in the customer's control that does not utilize an APNA. In terms of FIG. 1B, the NAT inbound processing of FIG. 8 and the outbound processing of FIG. 10 are done in the WAN ingress processor module and WAN egress processor module, respectively. A conduit service is not specified to be operative in an inside network. NAT can be configured primarily on LAN, Internet and intranet services. Such configuration means that when a packet arrives on such a service or is transmitted from that service, the NAT rules in FIGS. 8 and 10 are followed. For example, with a static inbound NAT with the service set to a LAN, then when a packet arrives at the APNA from the local LAN, such as indicated by the bottom arrow of FIG. 8, the source IP of the packet is translated as per the rule. This translation is done regardless of whether the packet is sent through a conduit, to the Internet, or to an intranet. Such a translation occurs without error because the outside IP address range is specified in the rule. When a packet is transmitted from a service, such as a packet from somewhere is transmitted to the local LAN, then a NAT is performed as per the top arrow in FIG. 8. In FIG. 1B, where packets coming from the LAN 186 on the APN client site A 152 go through a conduit, such as conduit 188, to APN client site B 154 and are then sent to Site B's local LAN, such as may be connected to conduit service 178, the NAT can be done when packets enter and leave the LAN and Sites A and B, but there is no rule that specifies a NAT can be done when packets enter the A-B conduit. In another example, If a NAT rule is set on the intranet service, such as the service to the non APN site 120 in FIG. 1A and traffic is flowing between the LAN and the intranet service, then the LAN would be considered outside, since it is outside of the intranet service, and the intranet would be considered on the inside. Outside and inside are determined by which service the NAT rule applies to.

Figure 11:
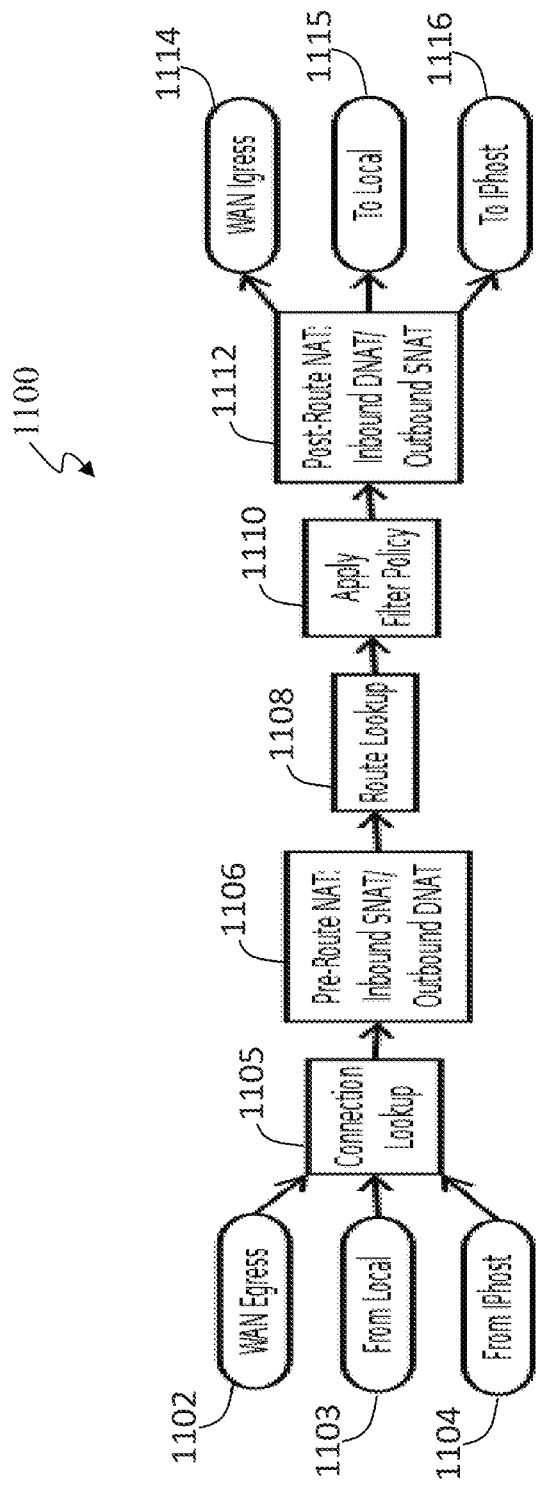
FIG. 11 illustrates an integrated firewall process in accordance with an embodiment of the present invention.

FIG. 11 illustrates an integrated firewall process 1100 in accordance with an embodiment of the present invention. FIG. 11 shows the processing of a single APNA, while FIG. 1B shows two APNA sites. The right to left configuration of FIG. 11 actually lines up fine. FIG. 1B shows that traffic from the LAN flows through the WAN ingress processor module 160. This lines up with receiving packets at local block 1103 in FIG. 11 and the processing pipeline delivers the packets to WAN ingress block 1114. FIG. 1B shows that packets sent to the WAN from 160 end up processed in the WAN egress processor module 166. This lines up with receiving packets at WAN egress block 1102 in FIG. 11 and delivering the packets to the local block 1115.

Reference to the processing steps of FIG. 3 are included to show the integrated firewall is part of a forwarding stage of a packet processing pipeline of the communication network. Regarding FIG. 3, FIG. 11 shows that packets can enter the integrated firewall pipeline from several places, including WAN egress block 1102, local block 1103, or IPhost block 1104, and leave that pipeline at a variety of services, including WAN ingress block 1114, local block 1115, or IPhost block 1116. The integrated firewall process 1100 primarily is implemented in the IP forwarding step 308 of FIG. 3 and in the IP forwarding step 420 of FIG. 4. At block 1102, a packet is received in the WAN ingress conduit processing module 160, corresponding to steps 304 and 306. Packets from the LAN, received from local block 1103, and headed to the conduit enter FIG. 11 at local block 1103 and leave at WAN ingress block 1114. This lines up with how packets arrive at the WAN ingress conduit processing module 160 in FIG. 1B. At block 1105, a connection lookup is executed, corresponding to step 308. Block 1105 occurs at either step 308 or step 420, depending on where the packet came from and where it is going. In terms of code, step 308 and step 420 are providing the same type of function. At block 1106, a pre-route NAT, or an inbound source NAT (SNAT), or an outbound destination NAT (DNAT) are performed in step 308, for example. At block 1108, a route lookup is executed, corresponding to step 308. At block 1110, the filter policy is applied, corresponding to step 308 integrated security including firewall policies including security zone evaluation. At block 1112, a post-route NAT, or an inbound DNAT, or an outbound SNAT are performed in step 308, for example. At the WAN ingress block 1114, the packet is transferred to WAN ingress processor module 160 of FIG. 1B also shown as WAN ingress conduit step 310 in FIG. 3.

The local block 1103 is the LAN 186 in FIG. 3 and the local block 1115 is the LAN 186 in FIG. 4. That is just traffic to and from the LAN. The IPhost blocks 1104 and 1116 are the IP stack of the APNA itself, so that is processed similarly to LAN traffic (local blocks 1103 and 1115). The IPhost block 1104 is packets from the IP stack of the APNA, such as a ping response to a ping request to a APNA VIP. The IPhost block 1116 is packets being sent to the IP stack of the APNA, such as a ping request to an APNA VIP. Where IPhost varies from local traffic is outside of the firewall code since the IPhost traffic doesn't go through Ethernet ports, for example.

Dynamic NAT is a form of NAT where some or all inside IP addresses are translated to a single outside IP address and TCP/UDP ports are translated to an available port on the outside address. Port masquerading can be enabled on individual Internet services, intranet services, and virtual interfaces.

The APNA supports two modes of dynamic NAT, port restricted and symmetric. Port-restricted NAT, a first mode of a dynamic NAT, is what many consumer grade gateway routers use. Inbound connections are generally disallowed unless a port is specifically forwarded to an inside address. Outbound connections allow reverse traffic from the same remote IP and port. Connections from the same inside IP and port must map to the same outside IP and port even if the outside IP or port is different, which is known as endpoint independent mapping. This requirement limits a port-restricted NAT firewall to 65535 simultaneous sessions, but facilitates an often used Internet technology knows as hole punching.

Symmetric NAT, a second mode of a dynamic NAT, is sometimes known as enterprise NAT because it allows for a much larger NAT space and enhances security by making translations less predictable. Inbound connections are generally disallowed unless a port is specifically forwarded to an inside address. Outbound connections allow reverse traffic from the same remote IP and port. Connections from the same inside IP, inside port, destination IP, and destination port tuple need to map to the same outside IP and port. Such mapping is known as endpoint dependent mapping. This mode explicitly prevents hole punching.

When dynamic NAT is in use, it is often necessary to choose specific port numbers on the outside IP address and allow them to be translated to a specific inside IP address and port. This translation is most often used when a server on the inside network needs to be accessible from the outside network without the server initiating the connection. The most common use of such translation in enterprise networks is with VOIP phone systems that need to allow inbound connections for incoming phone calls. Port forwarding rules can be defined on a service when dynamic NAT is enabled. Static NAT is an explicit 1:1 translation between an inside IP address or subnet and an outside IP address or subnet. Outside IP addresses used for static NAT may not be used for port masquerading. Due to the network specific nature of NAT policies, static NAT policies are defined on a site.

The data plane does NAT processing in two stages, pre-route and post-route. In the pre-route stage, the NAT is performed prior to making a routing decision on the packet. In the post-route stage, the NAT is performed after a routing decision has been made. Static NAT and dynamic NAT policies are evaluated in the pre-route and post-route stages.

Users can configure static NAT rules at the site level under connections and static NAT rules include the following parameters as shown in Table 12:

TABLE 12

| Name | Description |
| --- | --- |
| Direction | Inbound or Outbound |
| Service | Type and Name |
| Inside security zone and IP address/subnet | For inbound NAT rules, the inside security zone is inferred from the configured services |
| Outside security zone and IP address/subnet | For outbound NAT rules, the outside security zone is inferred from the configured services |

Users can configure dynamic NAT rules at the site level under connections and the dynamic NAT rules include the following parameters as shown in Table 13:

TABLE 13

| Name | Description |
| --- | --- |
| Direction | Inbound or Outbound |
| NAT type | Port restricted or symmetric |
| Service | type and name |
| Inside security zone and IP address/subnet | For inbound NAT rules, the inside security zone is inferred from the configured service and the outside security zone is inferred from the configured outside IP address |
| Outside security zone and IP address (must be a virtual IP address) | For outbound NAT rules, the outside security zone is inferred from the configured services and if the rule is configured on an Internet or intranet service, the outside IP address is inferred from the primary access interface. |

TABLE 13-continued

| Name | Description |
| --- | --- |
| IPsec | Passthrough |
| GRE/PPTP | Passthrough |
| Port forwarding rules | Port forwarding rules identify the protocol (TCP, UDP or both), outside port or port range, inside IP address and inside port or port range. Port forwarding rules also include settings that help automatically generate filter policies to allow traffic including connection tracking and log settings. |

Figure 16:
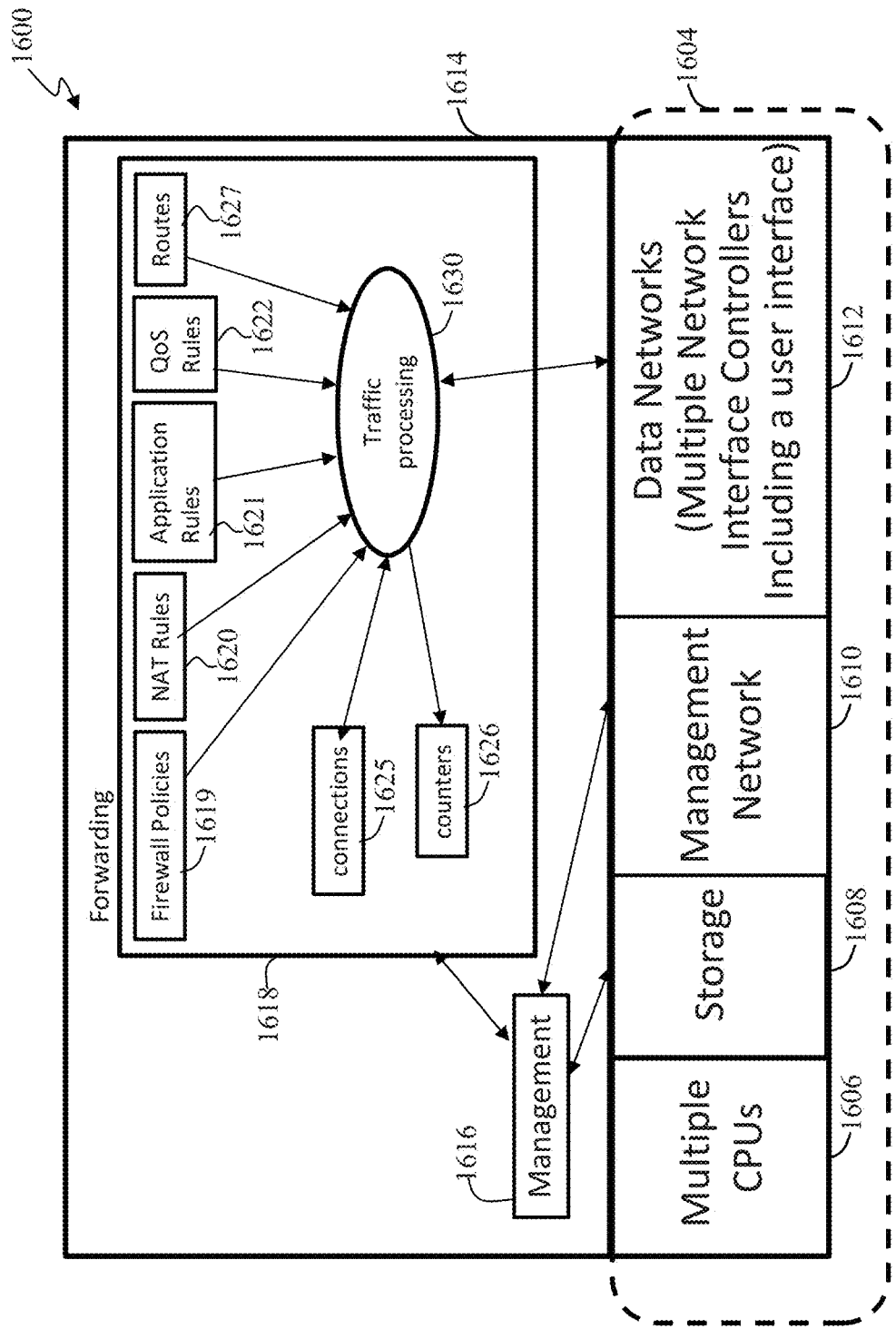
FIG. 16 illustrates an adaptive private network appliance (APNA) architecture for application and integrated firewall processing in accordance with an embodiment of the present invention.

The integrated firewall policies 1619 of FIG. 16 are configurable by a configuration editor through a user interface included at block 1612. The integrated firewall policies are configured at both a global and a site level. Globally, multiple integrated firewall policy templates can be configured. Each integrated firewall policy template contains pre-policies and post-policies. The pre-policies are applied to a site prior to any site-specific policies being applied and the post-policies are applied after site-specific policies are applied. The integrated firewall policies may be configured to be automatically applied to all sites in the APN. At the site level, the site-specific policies are considered before the global policies are applied. A policy is "considered" if a packet is checked against the rules that implement that policy. The configuration editor allows policies to be described in different scopes (global, pre-global site, and post-global site) and packets are checked against the policies in a specific order. For example, pre-global site policies are checked or considered first, then global policies are checked, and then post-global site policies are checked. Global and site level policies have the same set of criteria to determine what traffic matches the specified policy and also define some action to apply to matching traffic. For example, a policy match criteria for both global and site level may suitably include the policies listed in Table 14:

TABLE 14

| Name | Description |
| --- | --- |
| Source and destination security zone | Matches against the source and destination security zone of the packet |
| IP protocol | Matches against the IP protocol of the packet |
| Ipv4 fragmentation | True if matching of IP fragments are desired |
| Source and destination service type and name | Matches against the source and destination service type and name of the packet. At global level, a service name is only valid for conduit filters. |
| Source and destination IP | Matches against the source and destination IP address of the packet. |
| Source and destination port | Matches against the source and destination of the TCP and UDP packets. |

For example, the service type can be used to match packets that arrive on an intranet service and would be forwarded to an Internet service. This allows a behavior, as specified by a user from Table 15 below, to be applied that is different than traffic that comes from a conduit to be sent to the Internet. For example, the behavior depends on the policy the user specifies. Advantageously, the user can specify different actions with different policies. So, the user could allow intranet to Internet traffic and drop a conduit connected to Internet traffic, where allow and drop are described in Table 15. With this technique, security policies can be applied to traffic that moves from service to service. Advantageously, this application of security policies is easy to configure since the administrator does not have to build low-level rules with specific IP addresses. In addition, the use of policy tables, such as Tables 12-17, aids an administrator by ensuring that new low-level rules are added when something like a new conduit is introduced to the network.

The actions available to a security policy include the following listed in Table 15:

TABLE 15

| Name | Description |
| --- | --- |
| Allow | Accept this packet for processing |
| Drop | Silently discard this packet |
| Reject | Discard the packet but send a TCP reset or ICMP packet back to indicate that the traffic was not allowed |
| Count and continue | Update counters that the policy was hit, but continue checking policies down the list of policies. |

The integrated firewall policies have a configuration item to support auditing. For example, configuration items may suitably include, a log connection start, a log connection end, and a log interval S that is a frequency in seconds that logs updates about a firewall rule, assuming that the rule has been hit within that interval, and allowed, or denied. The configuration item allows event messages to be sent via a system log when a packet matches the match criteria of the policy and the system is going to perform the action tied to the policy. The configuration item when set allows events to be enabled and specifies a time value that controls an interval between events. Audit logging can issue events, such as created, deleted, allowed, and denied events. The created and deleted events are sent when a connection is created or deleted from the connection tracking database. These events are generated if a user configures the policy to log the start and end of a connection. The allowed and denied events are sent at regular intervals that are configured by the user. These events include a count of the number of packets accepted or rejected by the system. The configuration editor allows policies to be cloned when the user wants to make a new policy that is similar to an existing policy. Users can clone the policy and then change what they want to create the new policy.

A user can configure security zones in an APN and define policies to control how traffic enters and leaves the configured security zones. A default may be set such as having the system creates the following security zones as shown in Table 16:

TABLE 16

| Name | Description |
| --- | --- |
| Internet security zone | Applies to traffic to or from the Internet using a trusted interface |
| Untrusted Internet security zone | Applies to traffic to or from the Internet using an untrusted interface |
| Default LAN security zone | Applies to traffic to or from an object with a configurable security zone that has not set a zone |

The source security zone of a packet is determined from the service or virtual interface a packet is received on, with the exception of conduits. Users can assign a security zone to the objects listed in Table 17.

TABLE 17

| Name | Description |
| --- | --- |
| Virtual interfaces | The Virtual Interface that sends or receives this packet. |
| Intranet Services | The Intranet Service that sends or receives this packet. |
| LAN generic routing encapsulation (GRE) Tunnels | The LAN GRE Tunnel that sends or receives this packet. |
| LAN Internet Protocol security (IPsec) Tunnels | The LAN IPsec tunnel that sends or receives this packet. |

When traffic enters a conduit, the traffic is marked with a security zone that originated the traffic and that information is carried through the conduit. Security zones are used in the integrated firewall and NAT processing. This approach allows the far end of the conduit to make a decision based on how the traffic arrived at the conduit. For example, a network administrator may want to only allow traffic from VLAN 30 at site A to enter VLAN 40 at site B. The administrator can assign security zones for each of these VLANs and create policies that permit traffic between these security zones and block traffic from other security zones. The destination security zone of a packet is determined from a specified route a packet takes.

Routes shared with remote sites in the APN maintain information about the destination security zone, even if the route is learned via dynamic route learning which uses alternative routing protocols to learn a route from a current configuration. Using this mechanism of setting zone security policies, security zones gain global significance in the APN and allow end-to-end filtering in the APN.

The use of security zones provides a network administrator an efficient way to segment network traffic based on customer, business unit, or department, for example. Networks without the capability to set zone security policies and who want to do this type of traffic filtering, must drop packets out of their networks into an external firewall and possibly insert the traffic back into their networks for further processing. Such an approach would be difficult to configure and maintain due to lack of ability to dynamically change routing information based on conditions in the network as the integrated firewall is capable of doing. Also, such an approach increases complexity and suffers from the downside that the external firewall loses information about the true origin of traffic. For example, external firewalls lose information because the far end firewall does not know what security policies the near end firewall applied. The far end firewall makes a decision in a vacuum using only the packet it is holding and receives no policy input from other firewalls.

Figure 12A:
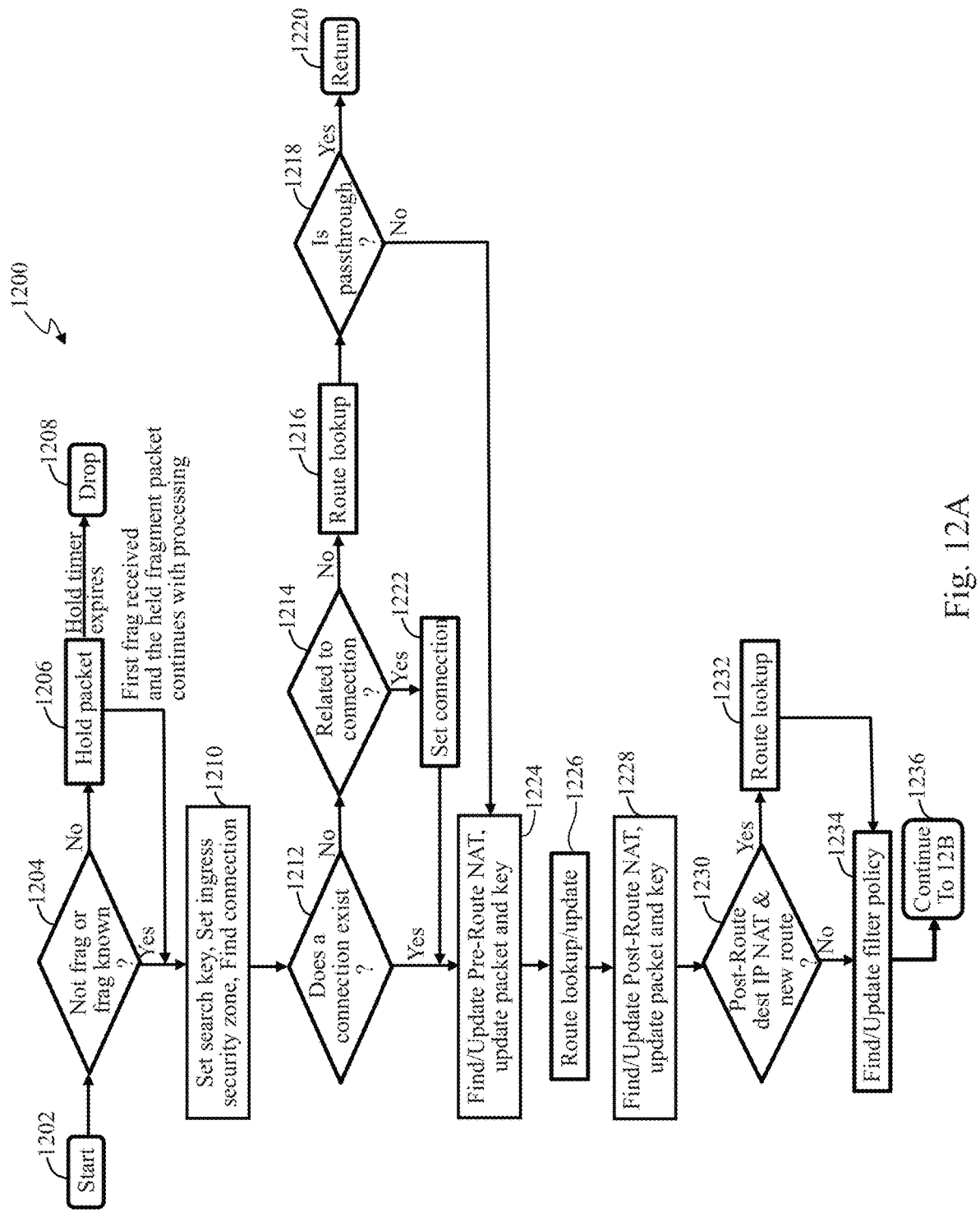
FIGS. 12A and 12B illustrates an exemplary integrated firewall process in accordance with an embodiment of the present invention.
Figure 12B:
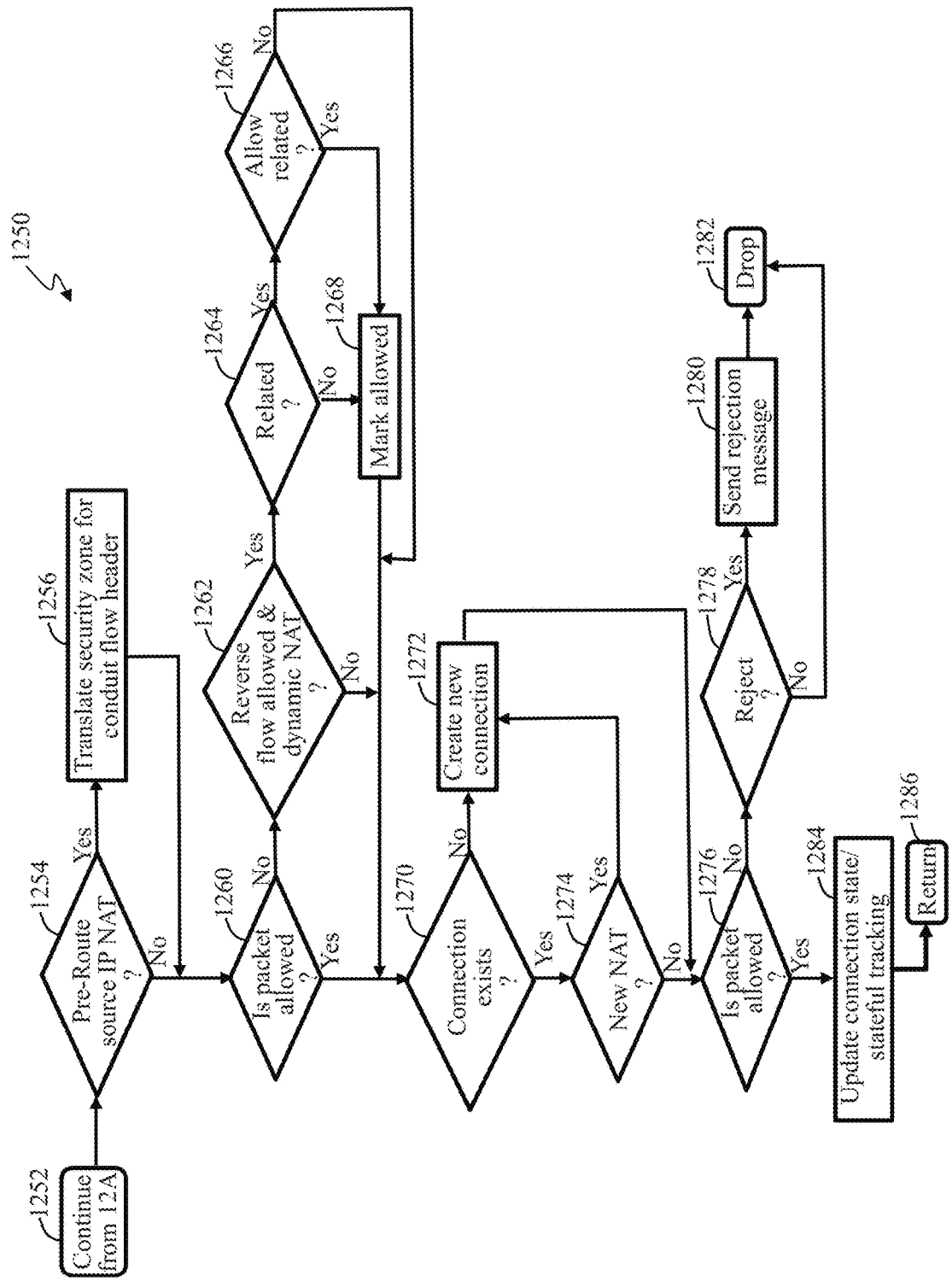

FIGS. 12A and 12B illustrates an exemplary integrated firewall process 1200 in accordance with an embodiment of the present invention. The process 1200 shows how the logical flow of FIG. 11 is implemented using various optimizations which allows a different order of steps than shown in FIG. 11. Both processes 1100 and 1200 are useful for their intended purposes. The integrated firewall process 1200 illustrates steps for identifying connections in IP forwarding, such as at step 308 in FIG. 3 and step 420 in FIG. 4, tracking connection states, performing NAT, and applying connection information to integrated firewall behaviors. At step 1202, the process 1200 starts, for example as called from step 306 of FIG. 3 or as called from step 418 of FIG. 4. At decision step 1204, a determination is made whether a packet received is not a fragment packet, which indicates it is a regular packet that has not been fragmented, or whether the received packet is a fragment packet that is known. If the determination is that the packet received is a fragment packet or the packet received is a fragment packet that is not known, the process 1200 proceeds to step 1206. At step 1206, the received fragment packet is held pending receipt of a further fragment packet, such as a first fragment packet. The fragment packet that is not known is held for a pre-specified amount of time, implemented by a hold timer, after which, if another fragment packet has not been received, the fragment packet that is not known is dropped at step 1208. Returning to step 1206, prior to the hold timer expiring, a first fragment packet is received and the held fragment packet continues with the process 1200 proceeding to step 1210. Returning to the decision step 1204, if the determination is that the packet received is not a fragment packet or the packet received is a fragment packet that is known, the process 1200 proceeds to step 1210.

At step 1210, a search key is set, such as a hash table key that is comprised of the routing domain ID, originator IP address, responder IP address, IP protocol, whether the IP protocol is TCP or UDP, originator port, responder port, and sequence ID if IP protocol is ICMP and the ICMP type uses a sequence ID. For example in one scenario, the received packet is determined to be a TCP packet in step 1210. Also, the WAN ingress source security zone and a destination security zone are set in the received packet and a search operation using the set search key is initiated to find a connection by using a connection hash table to find a pointer to the connection object entry in a connection hash table, such as the connection object Table 3 and as used at step 1104 of FIG. 11. At decision step 1212, a determination is made whether a connection exists for the packet. If a TCP connection is attempted and the far end sends an Internet control message protocol (ICMP) packet back that indicates a problem, the returned ICMP packet has different flow information than the original TCP packet and would normally be treated as a different connection. The integrated firewall as described herein is able to examine the inside of the ICMP packet and determine that it is related to the TCP connection and treat the packet as if it was part of the TCP connection. When ICMP is used to return error information to a sender, the IP and TCP header of the packet that triggered the ICMP error are included as data in the ICMP packet. So the integrated firewall looks "inside" the ICMP packet to get this data and uses it to see if this ICMP packet is related to an existing TCP connection. When a TCP connection is initiated, a SYN packet, which is a TCP packet with a SYN flag set, is sent to start a three way handshake to form the desired connection. That is an attempt at forming a connection. It is possible that an ICMP message is returned in response to the SYN packet instead of a TCP packet. This ICMP message would indicate some problem in making the TCP connection and is treated as related to the original connection at step 1214.

If a connection does not exist, the process 1200 proceeds to decision step 1214. At decision step 1214, a determination is made whether the ICMP packet is related to the TCP connection by examining the inside of the ICMP packet, as noted above. If the packet is not related to the connection, the process 1200 proceeds to step 1216. At step 1216, a route for the packet is looked up. At decision step 1218, a determination is made whether the route for the packet is a passthrough. A passthrough is a route that passes through an APN site, but never leaves the APN. The site identifies everything that can be communicated without going through a WAN link Some devices at a site may need to send traffic to pass through an APNA to get to other devices, but that passthrough traffic never goes to a WAN link. The passthrough traffic can be bridged traffic from passes through the APN because there are two interfaces on the same subnet. It could be VLAN traffic on a trunk that is not on a VLAN the APN is configured for. It could be L3 routed traffic from one local subnet to another. If a packet is to passthrough, the process 1200 proceeds to step 1220 and returns to the calling program. If there is no passthrough, the process 1200 proceeds to step 1224. Returning to decision step 1214, if the determination is made that the packet is related to the connection, the process 1200 proceeds to step 1222 and a connection is set, meaning the packet is marked as belonging to that connection.

At step 1224, the process 1200 finds and updates pre-route network address translation (NAT) and updates the packet and key. The zone of the packet changes when NAT is done. The zone that it is changed to is specified by the user in the NAT rule. At step 1106 of FIG. 11, a pre-route NAT means a source NAT for inbound traffic and a destination NAT (DNAT) for outbound traffic. What is done depends on NAT rules that a user has specified and how the user sets the direction parameter of those rules to inbound or outbound. See FIGS. 8 and 10 and associated description for the fields of the packet that are updated. The key contains IP addresses and port numbers so the same changes that are made to the packet as part of those figs is also made to the key. At step 1226, the route for the packet is looked up or updated as shown in step 1108 of FIG. 11. At step 1228, the process 1200 finds and updates post-route NAT and updates the packet and key. At decision step 1230, a determination is made whether the post route NAT step 1228 changed the destination IP address and if a new route needs to be looked up. A new route indication is a flag that is set during processing if a full route lookup needs to be done. In many cases, the results of a route lookup in the connection hash table can be cached, but if the route table has changed, as indicated by a change in a version number of the route table, then a new lookup in the route table is needed. At step 1230, if the determination that a new route table lookup is needed is yes, the process 1200 proceeds to step 1232. At step 1232, a new route for the packet is looked up and the process 1200 proceeds to step 1234. Returning to the decision step 1230, if the determination that a new route table lookup of decision step 1230 is not needed, the process 1200 proceeds to step 1234.

At step 1234, the filter policy is updated. At step 1234, a full check is made of the firewall policies which are cached and if the policies have changed, the policies are rechecked and the cache is updated. A version number of the policy database is kept in memory. The cache is stored in the connection object, see the indexes to NAT and filter policies row in Table 3 above. When new policies are applied by a user, this version number is incremented. The cache has the version number of the policy database when the policy was cached. To determine whether the policies have changed, the version numbers are examined to see if they are different or the same. This type of caching approach for data lookups is used to avoid locking of a central data structure by multiple threads needing to do lookups for each packet. Since the central data structure will not actually change much, threads can keep a local cache and use more memory to save CPU cycles. It is noted that in one optimization, the post-route NAT, at step 1228, may be accomplished before doing the policy filter, at step 1234, in order to have the final destination zone information available when the filters are applied. The IP addresses that are used when applying the filters are the original IP addresses from before the post-route NAT was performed. At step 1236, the process 1200 continues to the process steps of FIG. 12B.

At step 1252 of FIG. 12B, the process 1250 continues from step 1236 of FIG. 12A. At decision step 1254, a determination is made whether the pre-route source IP NAT from step 1224 changed the source IP address of the packet. At step 1254, if the determination is yes that the pre-route source IP NAT changed the source IP address of the packet, the process 1250 proceeds to step 1256. At step 1256, for WAN egress conduit packets, as processed in the WAN egress conduit processing pipeline 400 of FIG. 4, the source security zone of the packet is set based on data in the TRP encapsulation that was determined at step 418 of FIG. 4, and not based on the virtual interface where the packet was received. The conduit flow header is not updated for WAN egress packets. For WAN ingress, the conduit flow header is updated with the source security zone information added. On WAN egress the source security zone information is read from the flow header and stored in the packet descriptor. The process 1250 proceeds to step 1260. Returning to the decision step 1254, if the determination is that the pre-route source IP NAT did not change the source IP address of the packet, the process 1250 proceeds to step 1260.

At decision step 1260, a determination is made whether the packet is allowed. This determination is made based on the check and update of the filter policies done in step 1234. At step 1234, a full check is made of the integrated firewall policies which are cached and if the policies have changed, the policies are rechecked and the cache is updated. Checking the policies indicates whether the packet is allowed or not allowed. For example, the destination security zone stored in the packet header is checked against the integrated firewall policies to see if it is allowed to be transmitted. If the packet is not allowed to be transmitted, the process 1250 proceeds to decision step 1262.

At decision step 1262, a determination is made whether a reverse flow feature is allowed and whether a dynamic NAT is needed. For example, suppose dynamic NAT is configured for sending TCP traffic from source port 5523 to destination port 443. In order for the TCP connection to work, it is important that associated return traffic gets through from port 443 to port 5523. It may be that firewall policies would normally block inbound traffic like this, but since this flow is the reverse of a dynamic NAT connection that is allowed, this reverse traffic is allowed to pass the integrated firewall. For example, if there was never any outbound traffic from port 5523 to port 443, then packets arriving from port 443 to destination port 5523 would be blocked by the firewall policies. So the inbound traffic is only allowed because the outbound traffic exists and established a connection.

As described above, dynamic NAT is a form of NAT where some or all inside IP addresses are translated to a single outside IP address and TCP/UDP ports are translated to an available port on the outside address. The APNA supports two modes of dynamic NAT, port restricted and symmetric. Port-restricted NAT, a first mode of a dynamic NAT, is what many consumer-grade gateway routers use. Symmetric NAT, a second mode of a dynamic NAT, is sometimes known as enterprise NAT because it allows for a much larger NAT space and enhances security by making translations less predictable.

If the reverse flow feature is allowed and dynamic NAT is needed, the process 1250 proceeds to decision step 1264. At decision step 1264, a determination is made whether the packet is related to a connection that is allowed by the integrated firewall. For example, if a TCP connection is attempted and the far end sends an Internet control message protocol (ICMP) packet back that indicates a problem, the ICMP packet has different flow information than the original TCP packet and would normally be treated as a different connection. The integrated firewall as described herein is able to examine the inside of the ICMP packet and determine that the packet is related to the TCP connection and treat the ICMP packet as if it was part of the TCP connection. While similar to step 1214 of FIG. 12A, the logic of whether the packet is related is applied to a different situation. The operation at step 1214 is used to determine whether the packet is related to an existing connection. The operation at step 1264 is used to determine whether a packet related to a dynamic NAT connection should be allowed. The user can configure whether or not to allow related packets through the integrated firewall by modifying a Boolean setting on the NAT policy.

If the packet is related to the connection, the process 1250 proceeds to decision step 1266. At decision step 1266, a determination is made whether the related connection is allowed. If the related connection is not allowed, the process 1250 proceeds to decision step 1270. Returning to decision step 1264, if the packet is not related to the connection, the process 1250 proceeds to step 1268. Returning to decision step 1266, if the packet is allowed, the process 1250 proceeds to step 1268. At step 1268, the packet is marked allowed and the process 1250 proceeds to decision step 1270. The NAT policy states that a user may specify whether related connections are allowed or not allowed. The integrated firewall, as configured by a user, determines what is related to an existing connection and that is used for handling certain ICMP packets, though not limited to only ICMP packets. For example, certain ICMP error packets, such as destination unreachable, source quench, redirect, or time exceeded, that reference the IP's and ports of an existing connection may be considered related packets. Returning to decision step 1262, if the reverse flow feature is not allowed and dynamic NAT is not needed, the process 1250 proceeds to decision step 1270. Returning to decision step 1260, if the packet is allowed, the process 1250 proceeds to decision step 1270.

At decision step 1270, a determination is made whether a connection exists for the packet. At step 1212 of FIG. 12A, a determination was made whether a connection exists and the check made at step 1270 uses the information that was determined at step 1212. If a connection does not exist for the packet, the process 1250 proceeds to step 1272. At step 1272, a new connection is created for the packet and the process 1250 proceeds to decision step 1276. The new connection is added as an entry into the light weight hash table (LWHT), described above. Returning to decision step 1270, if a connection does exist for the packet, the process 1250 proceeds to decision step 1274. At decision step 1274, a determination is made whether a new NAT is needed. The determination at step 1274 depends on whether a NAT entry already exists. If a connection went away, the integrated firewall may still maintain the IP address and port mapping so that a new connection could use that existing NAT mapping. NAT stores its data in two main data structures, nat_rule_t and nat_masquerade_t, see above for more detail. If a new NAT is needed, the process 1250 proceeds to step 1272 where a new connection is created. If a new NAT is not needed, the process 1250 proceeds to decision step 1276.

At decision step 1276, a determination is made whether the packet is allowed. The determination at step 1276 generally uses the information determined at step 1260. However, the operation at step 1268 could have run in response to a no determination at step 1260 which would then cause a yes determination to be made at step 1276. If the packet is not allowed, the process 1250 proceeds to decision step 1278. At decision step 1278, a determination is made whether the packet should be rejected according to a reject policy as specified in Table 15 and configured by a user. If the packet is rejected, the process 1250 proceeds to step 1280. From Table 15, the reject policy is to discard the packet and send a TCP reset or ICMP packet back to indicate that the traffic was not allowed. At step 1280, a rejection message packet is sent to the originator of the packet that is being processed and the process 1250 proceeds to step 1282 where the packet is dropped. The destination IP of the rejection message packet is the source IP of the packet that is being processed. Returning to decision step 1278, if the packet is not rejected, the process 1250 proceeds to step 1282 where the packet is dropped without sending the rejection message, as configured by the user. Returning to decision step 1276, if the packet is allowed, the process 1250 proceeds to step 1284. At step 1284, the process 1250 maintains the state of a connection, such as whether the state of the connection is established, closed, and the like. Also, at step 1284, counters and events related to new or removed connections are updated, stateful tracking of monitored states of connection is initiated, and the process 1250 proceeds to step 1286 which returns to the calling program.

Figure 13:
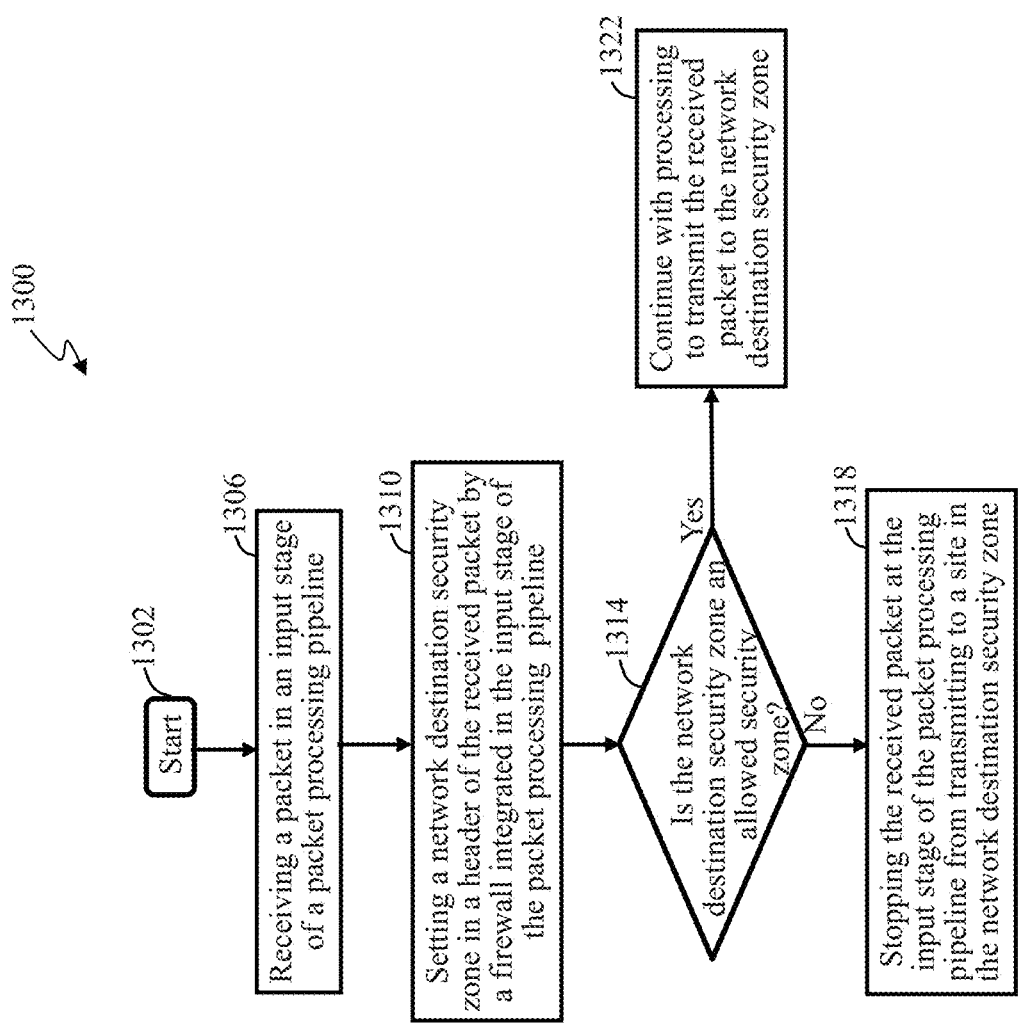
FIG. 13 illustrates a first integrated firewall packet filtering process based on global security zones of a communication network in accordance with an embodiment of the present invention.

FIG. 13 illustrates a first integrated firewall packet filtering process 1300 based on global security zones of a communication network in accordance with an embodiment of the present invention. At step 1302 the process 1300 is started, such as may occur in response to a call from a packet processing program. At step 1306, a packet is received in an input stage of a packet processing pipeline. At step 1310, a network destination security zone is set in a header of the received packet by a firewall integrated in the input stage of the packet processing pipeline. At step 1314, a determination is made whether the network destination security zone is an allowed security zone. If the determination is that the network security zone is not an allowed security zone, the process 1300 proceeds to step 1318. At step 1318, the received packet is stopped at the input stage of the packet processing pipeline from transmitting to a site in the network destination security zone. If the determination is that the network security zone is an allowed security zone, the process 1300 proceeds to step 1322. At step 1322, the processing to transmit the received packet to the network destination security zone is continued.

Figure 14:
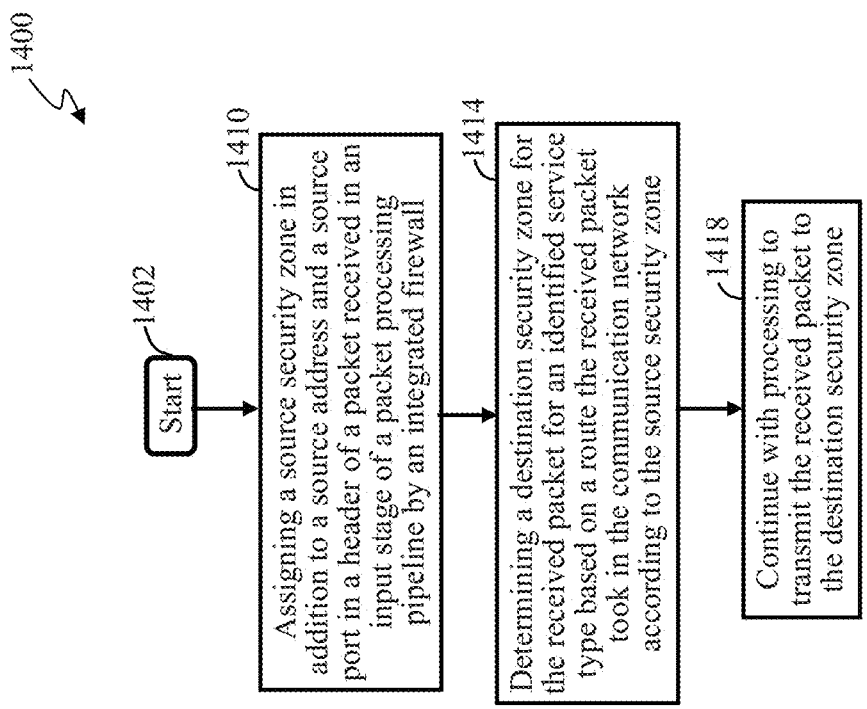
FIG. 14 illustrates a second integrated firewall packet filtering process based on global security zones of a communication network in accordance with an embodiment of the present invention.

FIG. 14 illustrates a second integrated firewall packet filtering process 1400 based on global security zones of a communication network in accordance with an embodiment of the present invention. At step 1402 the process 1400 is started, such as may occur in response to a call from a packet processing program. At step 1410, a source security zone is assigned in addition to a source address and a source port in a header of the received packet. At step 1414, a destination security zone is determined for the received packet for an identified service type based on a specified route the packet took in the communication network according to the source security zone. At step 1418, the processing to transmit the receive packet to the destination security zone is continued.

Figure 15:
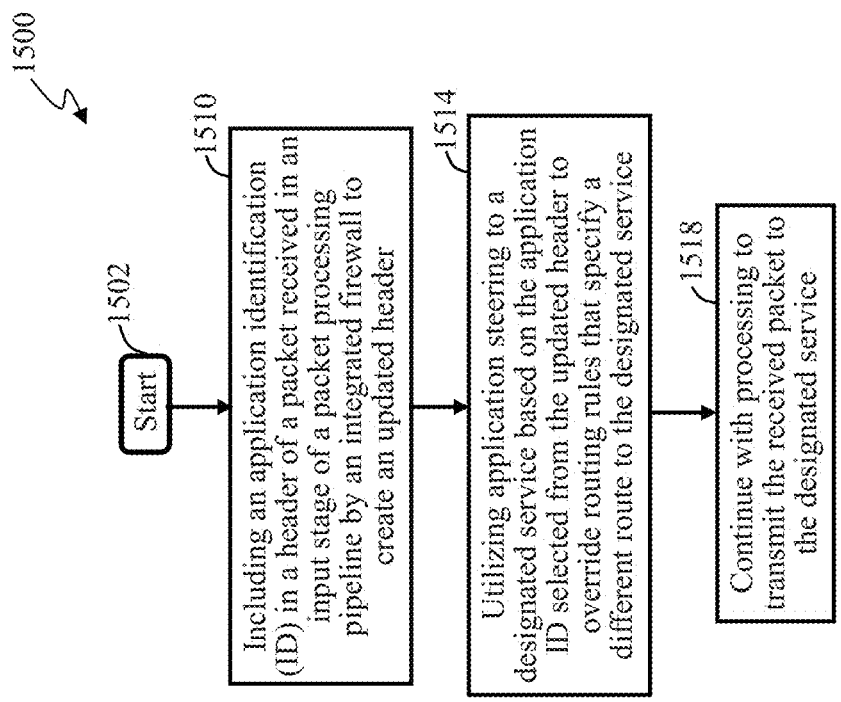
FIG. 15 illustrates a third integrated firewall packet filtering process based on global security zones of a communication network in accordance with an embodiment of the present invention.

FIG. 15 illustrates a third integrated firewall packet filtering process 1500 based on global security zones of a communication network in accordance with an embodiment of the present invention. At step 1502 the process 1500 is started, such as may occur in response to a call from a packet processing program. At step 1510, an application identification (ID) is included in a header of a packet received in an input stage of a packet processing pipeline by an integrated firewall to create an updated header. At step 1514, application steering to a designated service is utilized based on the application ID selected from the updated header to override routing rules that specify a different route to the designated service. At step 1518, the processing to transmit the received packet to the designated service is continued.

FIG. 16 illustrates an adaptive private network appliance (APNA) architecture 1600 for application and integrated firewall processing in accordance with an embodiment of the present invention. The APNA architecture 1600 includes a hardware portion 1604 and software portion 1614. The hardware portion 1604 comprises multiple central processing units (CPUs) 1606 configured in a parallel processing arrangement. Storage 1608 is configured as fast access memory for program storage and for fast access data storage and access to database storage. A management network 1610 and data networks and multiple network interface controllers including a user interface 1612 are hardware and software combinations that provide software configurability and access to high performance networks, peripheral ports for external devices, and APNA devices. The software portion 1614 includes a management component 1616 and an IP forwarding component 1618, such as providing the functions and features of step 308 of FIG. 3 and of step 420 of FIG. 4. The IP forwarding component 1618 includes tables for integrated firewall policies 1619, NAT rules 1620, application rules 1621, and quality of service (QoS) rules 1622 and functions to process connections 1625, counters 1626, and routes 1627. Traffic processing 1630 included in the IP forwarding component 1618 directs traffic to the multiple network interface controllers 1612 according to the policies and rules 1619-1622 and functions 1625-1627. The APNA architecture 1600 is designed to be scalable to support additional CPUs. For example, as noted above, a multi-threaded architecture of t2_app allows platforms with multiple CPUs to spread the processing of a packet across the multiple CPUs, which allows performance of the t2_app control program, including the IP forwarding component 1618 made up of blocks 1619-1622, 1625-1627, and 1630, to scale as more CPUs are made available.

While the present invention has been disclosed in the context of various aspects of presently preferred embodiments, it will be recognized that the invention may be suitably applied to other environments consistent with the claims which follow.

We claim:

1. A method for integrated firewall packet filtering based on global security zones of a communication network, the method comprising:

dividing the communication network into security zones in which plural of the security zones exist at at least one network site and at least one of the security zones exists at different network sites connected via conduits across an adaptive private network (APN);

defining an integrated firewall security zone configuration to be implemented by a firewall integrated within an input stage a conduit processing stage of a packet processing pipeline of an APN appliance, the integrated firewall security configuration including rules that specify whether to allow or deny traffic between the same and different security zones, each rule including at least one security zone identifier that applies to traffic to or from plural different IP addresses in the security zone and an action;

receiving a packet in the input stage of the conduit processing stage of the packet processing pipeline of the APN appliance;

inserting a network destination security zone identifier in a conduit flow header of the received packet by the firewall integrated in the input stage of the conduit processing stage of the packet processing pipeline of the APN appliance;

determining, using the destination security zone identifier in the conduit flow header and the rules in the integrated firewall security zone configuration that specify whether to allow or deny traffic between the same and different security zones and at a site ingressing packets to a conduit across the APN, which comprises a wide area network (WAN) leading to a destination site in the network destination security zone, that receiving the packet at the destination site would violate a security policy implemented by one of the rules specified in the integrated firewall configuration for the network destination security zone; and stopping, at the site ingressing the packets to the conduit, the received packet from transmitting through the conduit to the destination site in the network destination security zone.

2. The method of claim 1, wherein the communication network includes the APN.

3. The method of claim 1, wherein the integrated firewall is part of a forwarding stage of the packet processing pipeline of the APN appliance.

4. The method of claim 1 further comprising:

integrating application service types, network address translation (NAT) addresses, and security zones in a header of the received packet by a centralized function within a packet forwarding stage of a packet processing pipeline to enforce quality of service (QoS) rules.

5. The method of claim 1 further comprising:

integrating application classification in a header of the received packet by a centralized function within a packet forwarding stage of a packet processing pipeline to allow central administrative control of monitoring, security, and quality tools.

6. The method of claim 1 further comprising:

classifying applications in the integrated firewall based on domain names; and steering traffic of the classified applications to services according to pre-specified heuristics, wherein the traffic of the classified applications is monitored and analyzed.

7. The method of claim 1 further comprising:

executing a pre-route network address translation (NAT) on the received packet to generate a translated source address;

looking up a route and associated security zone based on the translated source address; and applying a filter policy associated with the looked up route to determine that the network destination security zone is not an allowed security zone destination for the received packet.

8. A method for integrated firewall packet filtering based on global security zones of a communication network, the method comprising:

dividing the communication network into security zones in which plural of the security zones exist at at least one network site and at least one of the security zones exists at different network sites connected via conduits across an adaptive private network (APN);

defining an integrated firewall security zone configuration to be implemented by a firewall integrated within an input stage a conduit processing stage of a packet processing pipeline of an APN appliance, the integrated firewall security configuration including rules that specify whether to allow or deny traffic between the same and different security zones, each rule including at least one security zone identifier that applies to traffic to or from plural different IP addresses in the security zone and an action;

inserting, by the firewall integrated within the input stage of the conduit processing stage of the packet processing pipeline of the APN appliance, a source security zone identifier in addition to a source address and a source port in a conduit flow header of a packet received in the input stage of a conduit processing stage of the packet processing pipeline of the APN appliance;

receiving the packet having the source security zone identifier in the conduit flow header; and determining, using the source security zone identifier in the conduit flow header and the rules in the integrated firewall security zone configuration that specify whether to allow or deny traffic between the same and different security zones and at a site ingressing packets to a conduit across the APN, which comprises a wide area network (WAN) leading to a destination site in a destination security zone, that receiving the packet from the source security zone at the destination site would violate a security policy implemented by one of the rules specified at the site ingressing the packets for the destination security zone given that the packet originated from the source security zone; and stopping, at the site ingressing packets to the conduit, the received packet from transmitting through the conduit to the destination site in the destination security zone.

9. The method of claim 8, wherein the communication network includes the APN.

10. The method of claim 8, wherein the integrated firewall is part of a forwarding stage of the packet processing pipeline of the APN appliance.

11. The method of claim 8 further comprising:
executing a pre-route network address translation (NAT) on the received packet to generate a translated source address; and
applying a filter policy associated with the looked up route based on the translated source address to determine the network destination security zone.

12. The method of claim 8, wherein security zones span across the APN.

13. The method of claim 8, wherein traffic is allowed between security zones that are permitted and blocked from security zones that are not permitted.

14. A method for integrated firewall packet filtering based on global security zones of a communication network, the method comprising:

dividing the communication network into security zones in which plural of the security zones exist at at least one network site and at least one of the security zones exists at different network sites connected via conduits across an adaptive private network (APN);

defining an integrated firewall security zone configuration to be implemented by a firewall integrated within an input stage a conduit processing stage of a packet processing pipeline of a first APN appliance, the integrated firewall security configuration including rules that specify whether to allow or deny traffic between the same and different security zones, each rule including at least one security zone identifier that applies to traffic to or from plural different IP addresses in the security zone and an action;

receiving a packet at the first APN appliance at a site ingressing packets to a conduit across the APN, which comprises a wide area network (WAN);

performing, by the first APN appliance, an Internet protocol (IP) forwarding step for the packet, wherein performing the IP forwarding step includes performing firewall filtering by the firewall integrated within the packet processing pipeline of the first APN appliance, identifying an application to which the packet is directed, and inserting an application identification (ID) in a conduit flow header of the packet;

transmitting, by the first APN appliance, the packet through the conduit over the WAN; and receiving the packet at a second APN appliance at a site egressing packets from the conduit that have traveled through the conduit across the WAN;

utilizing, by the second APN appliance, application steering to a designated service based on the application ID selected from the conduit flow header to override routing rules that specify a different route to the designated service.

15. The method of claim 14 further comprising:
wherein identifying the application includes looking up the application ID in an application classification table in a WAN ingress processor module; and
wherein utilizing application steering comprises accessing the application ID from the updated header in a WAN egress processor module.

16. The method of claim 14, wherein the communication network includes the APN.

17. The method of claim 14, wherein the integrated firewall is part of a forwarding stage of the packet processing pipeline of the first APN appliance.

18. The method of claim 14 further comprising:
building route tables that contains a destination security zone for routes in the communication network by a centralized function within a packet forwarding stage of the packet processing pipeline.

19. The method of claim 14 further comprising:
executing a pre-route network address translation (NAT) on the received packet to generate a translated source address; and
applying a filter policy associated with a looked up route to determine the network destination security zone based on the translated source address.

* * * * *